(12) United States Patent
Chui et al.

(10) Patent No.: US 9,113,416 B2
(45) Date of Patent: Aug. 18, 2015

(54) SYSTEM AND METHOD FOR REDUCING OVERHEAD OF SEARCHER TASKS FOR DISCONTINUOUS RECEPTION

(75) Inventors: Jimmy C. Chui, Mountain View, CA (US); An-swol C. Hu, Belmont, CA (US); Jittra Jootar, Santa Clara, CA (US); Feng Lu, Sunnyvale, CA (US); Yi Su, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 957 days.

(21) Appl. No.: 13/290,033

(22) Filed: Nov. 4, 2011

(65) Prior Publication Data

US 2012/0294169 A1 Nov. 22, 2012

Related U.S. Application Data

(60) Provisional application No. 61/412,271, filed on Nov. 10, 2010.

(51) Int. Cl.
*G08C 17/00* (2006.01)
*H04W 52/02* (2009.01)
*H04W 52/14* (2009.01)

(52) U.S. Cl.
CPC .......... *H04W 52/0274* (2013.01); *H04W 52/02* (2013.01); *H04W 52/028* (2013.01); *H04W 52/14* (2013.01); *Y02B 60/50* (2013.01)

(58) Field of Classification Search
CPC .................................................. H04W 52/02
USPC ......................................................... 370/311
See application file for complete search history.

(56) References Cited

U.S. PATENT DOCUMENTS

| | | | |
|---|---|---|---|
| 7,684,799 B2 | 3/2010 | Kuchibhotla et al. | |
| 2004/0023634 A1* | 2/2004 | Jeong et al. | 455/403 |
| 2009/0088148 A1 | 4/2009 | Chung et al. | |
| 2009/0088178 A1 | 4/2009 | Jugl et al. | |
| 2009/0318177 A1* | 12/2009 | Wang et al. | 455/515 |
| 2010/0009643 A1* | 1/2010 | Haartsen | 455/127.5 |
| 2010/0014429 A1* | 1/2010 | Kim et al. | 370/241 |
| 2010/0015984 A1* | 1/2010 | Kazmi | 455/437 |

(Continued)

OTHER PUBLICATIONS

3GPP TS 25.214 V7.16.0, 3rd Generation Partnership Project: Technical Specification Group Radio Access Network; Physical layer prodedures (FDD) (Release 7)(Sep. 2010).

(Continued)

*Primary Examiner* — Farah Faroul
(74) *Attorney, Agent, or Firm* — Charles E. Eggers

(57) ABSTRACT

At least one feature pertains to a method of communication that comprises aligning a measurement task that utilizes a resource within a user equipment, such that at least a portion of the measurement task is performed during a time that the resource is enabled in the user equipment, and executing the measurement task during the time that the resource is enabled in the user equipment. In one example, the measurement task may be a searcher task, the resource may comprise receiver circuitry, and the time that the resource is enabled corresponds to a DRX monitoring interval of a downlink channel, such as a high speed shared control channel. By aligning and executing the searcher task during the time that the resource is enabled in the user equipment, searcher overhead may be reduced. Reducing searcher overhead allows the user equipment to save power by disabling the receiver circuitry.

30 Claims, 17 Drawing Sheets

(56) References Cited

U.S. PATENT DOCUMENTS

| | | | |
|---|---|---|---|
| 2010/0074188 A1 | 3/2010 | Hsu | |
| 2010/0173637 A1* | 7/2010 | Damnjanovic et al. | 455/447 |
| 2010/0216474 A1* | 8/2010 | Park et al. | 455/436 |
| 2010/0322173 A1 | 12/2010 | Marinier et al. | |
| 2011/0280221 A1 | 11/2011 | Chin et al. | |
| 2011/0317627 A1* | 12/2011 | Kato et al. | 370/328 |
| 2012/0113825 A1* | 5/2012 | Baglin et al. | 370/252 |
| 2012/0275366 A1* | 11/2012 | Anderson et al. | 370/311 |
| 2013/0044674 A1* | 2/2013 | Teyeb et al. | 370/315 |
| 2013/0223370 A1* | 8/2013 | Larmo et al. | 370/329 |

OTHER PUBLICATIONS

3GPP TS 25.331 V8.12.0 ""3rd Generation Partnership Project: Technical Specification Group Radio Access Network; Radio Resource Control (RRC); Protocol specification (Release 8)(Sep. 2010).

3GPP TSG RAN WG2 Meeting #57bis, "Discontinuous Reception in CELL-FACH", R2-071161, St. Julian's, Malta, Mar. 26-30, 2007.

3rd Generation Partnership Project; Technical Specification Group Radio Access Network; "Continuous Connectivity for Packet Data Users," 3GPP TS 25.903, V7.0.0, Mar. 2007, pp. 1-138.

* cited by examiner

SYSTEM AND METHOD FOR REDUCING OVERHEAD OF SEARCHER TASKS FOR DISCONTINUOUS RECEPTION

CLAIM OF PRIORITY

The present application for patent claims priority to U.S. Provisional Patent Application No. 61/412,271, titled "System and Method for Reducing Overhead of Searcher Tasks for Discontinuous Reception" and filed Nov. 10, 2010, the entire disclosure of which is hereby expressly incorporated by reference herein.

BACKGROUND

1. Field

Aspects of the present disclosure relate generally to wireless communication systems, and more particularly to task scheduling within user equipment for wireless communication systems.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provide higher data transfer speeds and capacity to associated UMTS networks. Long Term Evolution (LTE), also referred to as enhanced UTRA (E-UTRA) is a further successor technology standardized by the 3GPP.

Discontinuous Reception (DRX) is a power-saving feature in wireless technologies where a user equipment (UE) (e.g., including but not limited to a mobile phone, a smartphone, a laptop computer, a mobile device, etc.) monitors a subset of downlink channels over specified time intervals. The UE and its associated network may negotiate the specified time intervals during which data transfers relevant to the UE may occur. When the UE monitors the subset of downlink channels over the specified time intervals, the UE's receiver circuitry may be on. At other times, for example when the UE is not monitoring the downlink channels, the UE may shut down receiver circuitry to reduce current usage and increase battery life. The circuitry shut down can include but is not limited to radio receivers and hardware used for despreading, demodulation, channel estimation, and channel decoding.

In addition to monitoring downlink channels over specified time intervals, the UE also performs certain measurement tasks that include but are not limited to searcher tasks. As one example, searcher tasks in wireless technologies are used to detect neighboring cells and determine signal strengths in the serving and neighboring cells, possibly across multiple radio access technologies. While specifications may standardize some timing requirements for the execution of these searcher tasks (e.g., maximum detection/measurement reporting intervals), timing of such measurements made by searcher algorithms at the UE are generally implementation specific. These measurements may be made by the UE on received waveforms/signals while receiver circuitry is on/enabled.

If DRX is configured to be active, then a UE generally ensures that the receiver circuitry (and any other associated circuitry) is enabled during times when the UE monitors downlink channels and also during times when the UE performs searcher tasks. The additional amount of time that searcher tasks require the receiver circuitry to be on/enabled, beyond the amount of time receiver circuitry is required to be on/enabled to monitor downlink channels, may be broadly defined as searcher overhead. Searcher overhead consumes additional energy and may decrease the battery life of the UE. Thus, there is a demand for a way to conserve UE power by reducing searcher overhead.

SUMMARY

One feature provides a method of wireless communication that comprises aligning a measurement task that utilizes a resource within a user equipment (UE), such that at least a portion of the measurement task is performed during a time that the resource is enabled in the UE, and executing the measurement task during the time that the resource is enabled in the UE. In one aspect of the present disclosure, the measurement task comprises a searcher task. In another aspect, the resource comprises receiver circuitry. In yet another aspect, the time that the receiver circuitry is enabled in the UE comprises a discontinuous reception (DRX) time interval. In another aspect, the time that the receiver circuitry is enabled in the UE comprises a time interval when a fractional downlink physical channel (F-DPCH) is monitored. In yet another aspect, monitoring of the F-DPCH is associated with discontinuous transmission (DTX) of uplink dedicated physical control channel (DPCCH) bursts. In another aspect, the time that the receiver circuitry is enabled in the UE further comprises a period of time that is prior to the DRX time interval.

In yet another aspect, the DRX time interval comprises at least one subframe, and occurs with a periodicity corresponding to a modulus of one of 4, 5, 8, 10, 16, or 20 subframes. In another aspect, the DRX time interval comprises at least one frame, and occurs with a periodicity corresponding to a modulus of one of 4, 8, 16, or 32 frames. In yet another aspect, the DRX time interval comprises a schedule for monitoring of downlink transmissions on at least a high speed shared control channel (HS-SCCH). In another aspect, the DRX time interval comprises a schedule for monitoring of downlink transmissions on at least an enhanced absolute grant channel (E-AGCH). In yet another aspect, the searcher task is aligned to execute at substantially the same time as the HS-SCCH monitoring begins. In another aspect, the searcher task is aligned to execute some time before the HS-SCCH monitoring begins, and the receiver circuitry is enabled during this time in anticipation of the HS-SCCH monitoring. In yet another aspect, the searcher task is completed prior to an end of the DRX time interval. In another aspect, the searcher task lasts longer than the DRX time interval, and the receiver circuitry remains enabled at least until an end of the searcher task. In yet another aspect, aligning of the searcher tasks is adapted to retain a searcher task frequency as utilized in a non-DRX mode. In another aspect, a plurality of searcher tasks are executed in a single DRX time interval. In yet another aspect, the method further comprises initializing a timer during the DRX time interval when information relevant to the user equipment is received on a downlink channel, extending the time that the receiver circuitry is enabled until an expiry of the timer, and aligning execution of the searcher task during a running of the timer.

Another feature provides an apparatus for wireless communication that comprises a communications interface adapted to communicate with a network, and a processor communicatively coupled to the communications interface, where the processor is adapted to: align a measurement task that utilizes a resource within a user equipment (UE), such that at least a portion of the measurement task is performed during a time that the resource is enabled in the UE; and execute the measurement task during the time that the resource is enabled in the UE. In one aspect of the present disclosure, the processor is further adapted to initialize a timer during the DRX time interval when information relevant to the user equipment is received on a downlink channel, extend the time that the receiver circuitry is enabled until an expiry of the timer, and align execution of the searcher task during a running of the timer.

Another feature provides an apparatus for wireless communication that comprises a means for aligning a measurement task that utilizes a resource within a user equipment (UE), such that at least a portion of the measurement task is performed during a time that the resource is enabled in the UE, and a means for executing the measurement task during the time that the resource is enabled in the UE. In one aspect of the present disclosure, the apparatus further comprises a means for initializing a timer during the DRX time interval when information relevant to the user equipment is received on a downlink channel, a means for extending the time that the receiver circuitry is enabled until an expiry of the timer, and a means for aligning execution of the searcher task during a running of the timer.

Another feature provides for a computer-readable medium having instructions, which when executed by at least one processor causes the processor to align a measurement task that utilizes a resource within a user equipment, such that at least a portion of the measurement task is performed during a time that the resource is enabled in the UE, and execute the measurement task during the time that the resource is enabled in the UE. In one aspect of the present disclosure, the instructions which when executed by the processor further cause the processor to initialize a timer during the DRX time interval when information relevant to the user equipment is received on a downlink channel, extend the time that the receiver circuitry is enabled until an expiry of the timer, and align execution of the searcher task during a running of the timer.

BRIEF DESCRIPTION OF THE DRAWINGS

The features, nature, and advantages of the present features may become more apparent from the detailed description set forth below when taken in conjunction with the drawings in which like reference characters identify correspondingly throughout.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In the following description, certain terminology is used to describe certain features of one or more aspects of the disclosure. For instance, the term "exemplary" as used herein is defined as serving as one example or illustration.

Overview

In an aspect of the present disclosure, searcher overhead can be reduced by aligning execution of searcher tasks during times when a UE's receiver circuitry (and/or other associated circuitry) is enabled for monitoring of downlink channels associated with a DRX cycle. Searcher tasks generally do not disrupt the required downlink channel monitoring, and therefore, simultaneous operation of searcher tasks and downlink channel monitoring may be performed. Therefore, in one aspect of the present disclosure, at least a portion of a searcher task is aligned to be performed during at least a portion of a DRX downlink channel monitoring interval. As just one example, a searcher task may be aligned to begin at substantially the same time that a downlink channel is monitored according to a DRX cycle. As another example, a searcher task may be aligned to begin before a downlink channel is monitored according to a DRX cycle. By aligning the searcher tasks as much as possible with the monitoring intervals where the receiver circuitry is already assumed to be enabled, the UE has a greater opportunity to save power by disabling the receiver circuitry. Thus, an aspect of this disclosure may provide the UE with more power savings opportunities.

Exemplary Network Environment

Figure 1:
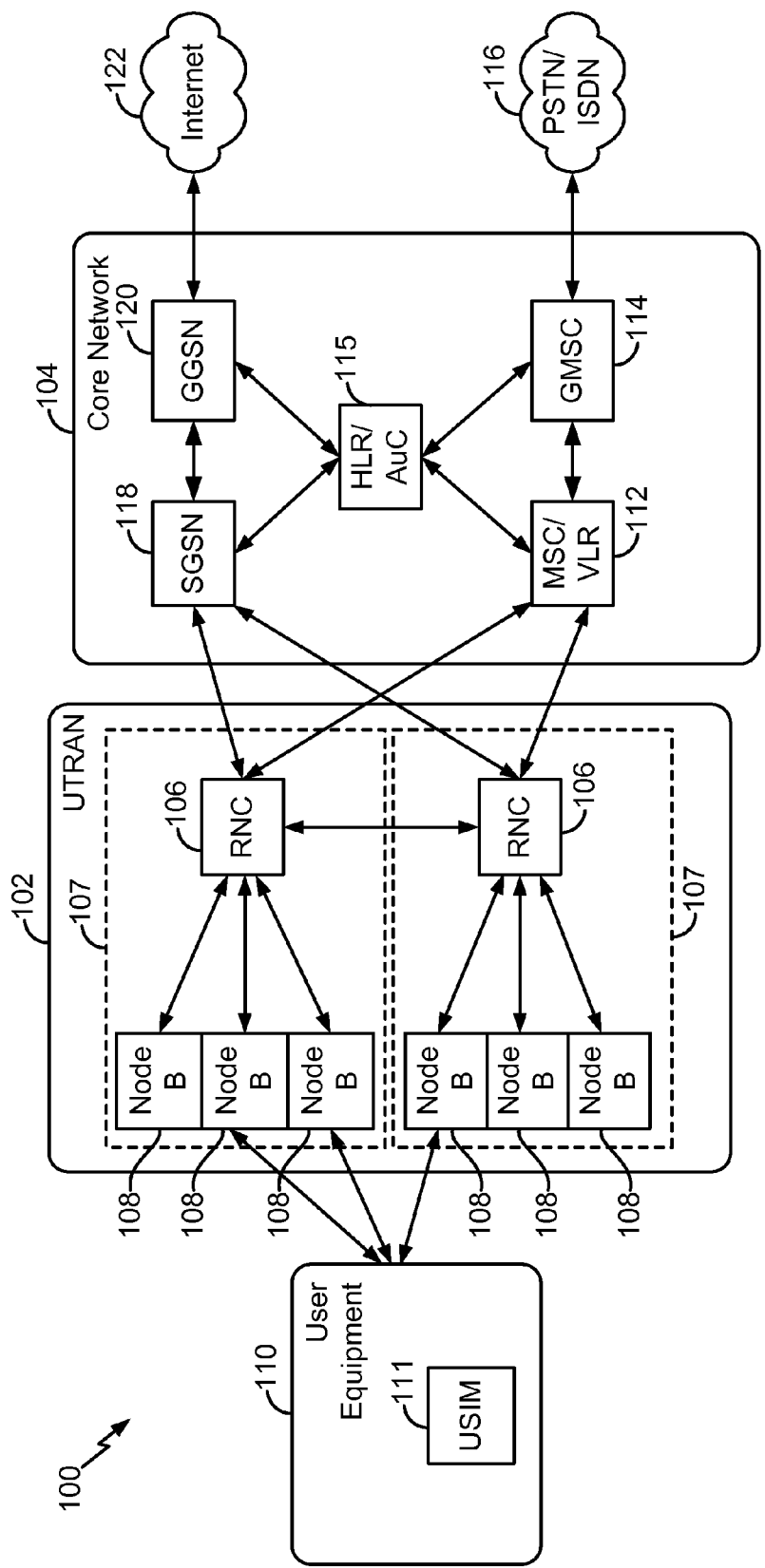
FIG. 1 illustrates a block diagram of a telecommunications system.

The various concepts presented throughout this disclosure may be implemented across a broad variety of telecommunication systems, network architectures, and communication standards. By way of example and without limitation, some aspects of the present disclosure are presented with reference to a UMTS network 100 illustrated in FIG. 1 employing a W-CDMA air interface. A UMTS network 100 includes three interacting domains: a core network (CN) 104, a UMTS terrestrial radio access network (UTRAN) 102, and a user equipment (UE) 110. In this example, the UTRAN 102 provides various wireless services including telephony, video, data, messaging, broadcasts, and/or other services. The UTRAN 102 may include a plurality of radio network subsystems (RNSs) such as an RNS 107, each controlled by a respective radio network controller (RNC) such as an RNC 106. Here, the UTRAN 102 may include any number of RNCs and RNSs in addition to the RNCs 106 and RNSs 107 illustrated herein. The RNCs 106 are apparatuses responsible for, among other things, assigning, reconfiguring and releasing radio resources within the RNS 107. The RNCs 106 may be interconnected to other RNCs (not shown) in the UTRAN 102 through various types of interfaces such as a direct physical connection, a virtual network, or the like, using any suitable transport network.

Communication between a UE 110 and a Node B 108 may be modeled as including a physical layer and a medium access control (MAC) layer. Moreover, communication between a UE 110 and an RNC 106 by way of a respective Node B 108 may be modeled as including a radio resource control (RRC) layer. In the instant specification, the physical layer may be considered layer 1; the MAC layer may be considered layer 2; and the RRC layer may be considered layer 3. Information herein below utilizes terminology introduced in RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station, a base transceiver station, a radio base station, a radio transceiver, a transceiver function, a basic service set, an extended service set, an access point, or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses.

Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as UE 110 in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In a UMTS system, the UE 110 may further include a universal subscriber identity module (USIM) 111, which contains a user's subscription information to a network. For illustrative purposes, one UE 110 is shown in communication with a number of the Node Bs 108. The downlink (also called the forward link) refers to the communication link from a Node B 108 to a UE 110, and the uplink (also called the reverse link) refers to the communication link from a UE 110 to a Node B 108.

The CN 104 interfaces with one or more access networks, such as the UTRAN 102, and may be a GSM core network. However, those skilled in the art will recognize that the various concepts presented throughout this disclosure may be implemented in a radio access network, or other suitable access network, to provide UEs with access to types of core networks other than GSM networks.

The CN 104 includes a circuit-switched domain and a packet-switched domain. Some of the circuit-switched elements may be a mobile services switching center, a visitor location register (VLR) 112 and a gateway mobile switching center (GMSC) 114. Packet-switched elements include a serving GPRS support node (SGSN) 118 and a gateway GPRS support node (GGSN) 120. Some network elements, like an equipment identity register, a home location register (HLR) 115, a VLR 112, and an authentication center (AuC) 115 may be shared by both of the circuit-switched and packet-switched domains.

In the illustrated example, the CN 104 supports circuit-switched services with an MSC 112 and a GMSC 114. In some applications, the GMSC 114 may be referred to as a media gateway. One or more RNCs 106 may be connected to the MSC 112. The MSC 112 is an apparatus that controls call setup, call routing, and UE mobility functions. The MSC 112 also includes a VLR that contains subscriber-related information for the duration that a UE 110 is in the coverage area of the MSC 112. The GMSC 114 provides a gateway through the MSC 112 for the UE 110 to access a circuit-switched network 116. The GMSC 114 includes the HLR 115 containing subscriber data, such as the data reflecting the details of the services to which a particular user has subscribed. The HLR 115 is also associated with an authentication center that contains subscriber-specific authentication data. When a call is received for a particular UE 110, the GMSC 114 queries the HLR 115 to determine the UE's location and forwards the call to the particular MSC 112 serving that location.

The CN 104 also supports packet-data services with the serving GPRS support node (SGSN) 118 and the gateway GPRS support node GGSN 120. GPRS, which stands for general packet radio service, is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the uplink and downlink between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include high speed downlink packet access (HSDPA) and high speed uplink packet access (HSUPA), also referred to as enhanced uplink (EUL).

HSDPA utilizes as its transport channel the high-speed downlink shared channel (HS-DSCH). The HS-DSCH is implemented by three physical channels: the high speed-physical downlink shared channel (HS-PDSCH), the high-speed shared control channel (HS-SCCH), and the high-speed dedicated physical control channel (HS-DPCCH). The HS-PDSCH is the channel mapped to the above HS-DSCH transport channel that carries actual user data.

Among these physical channels, the HS-SCCH carries control information utilized by the UE for decoding the data information carried on the HS-PDSCH. In an example with a 2-ms subframe that includes three slots, the HS-PDSCH subframe is generally aligned to begin two slots later than the HS-SCCH subframe, so that the UE may receive the control information provided on the HS-SCCH, and have sufficient time to process the control information to begin decoding the HS-PDSCH two slots later. Further, the HS-DPCCH carries the HARQ ACK/NACK signaling on the uplink to indicate whether a corresponding packet transmission on the HS-PDSCH was decoded successfully. That is, with respect to the downlink, the UE 110 provides feedback to the Node B 108 over the HS-DPCCH to indicate whether it correctly decoded a packet on the downlink. HS-DPCCH further includes feedback signaling from the UE 110 to assist the Node B 108 in taking the right decision in terms of modulation and coding scheme and precoding weight selection, this feedback signaling including the CQI and PCI.

"HSPA Evolved" or HSPA+ is an evolution of the HSPA standard that may include multiple-input and multiple-output (MIMO) and/or 64-QAM, enabling increased throughput and higher performance. That is, in an aspect of the disclosure, the Node B 108 and/or the UE 110 may have multiple antennas supporting MIMO technology. The use of MIMO technology enables the Node B 108 to exploit the spatial domain to support spatial multiplexing, beamforming, and transmit diversity.

Figure 2:
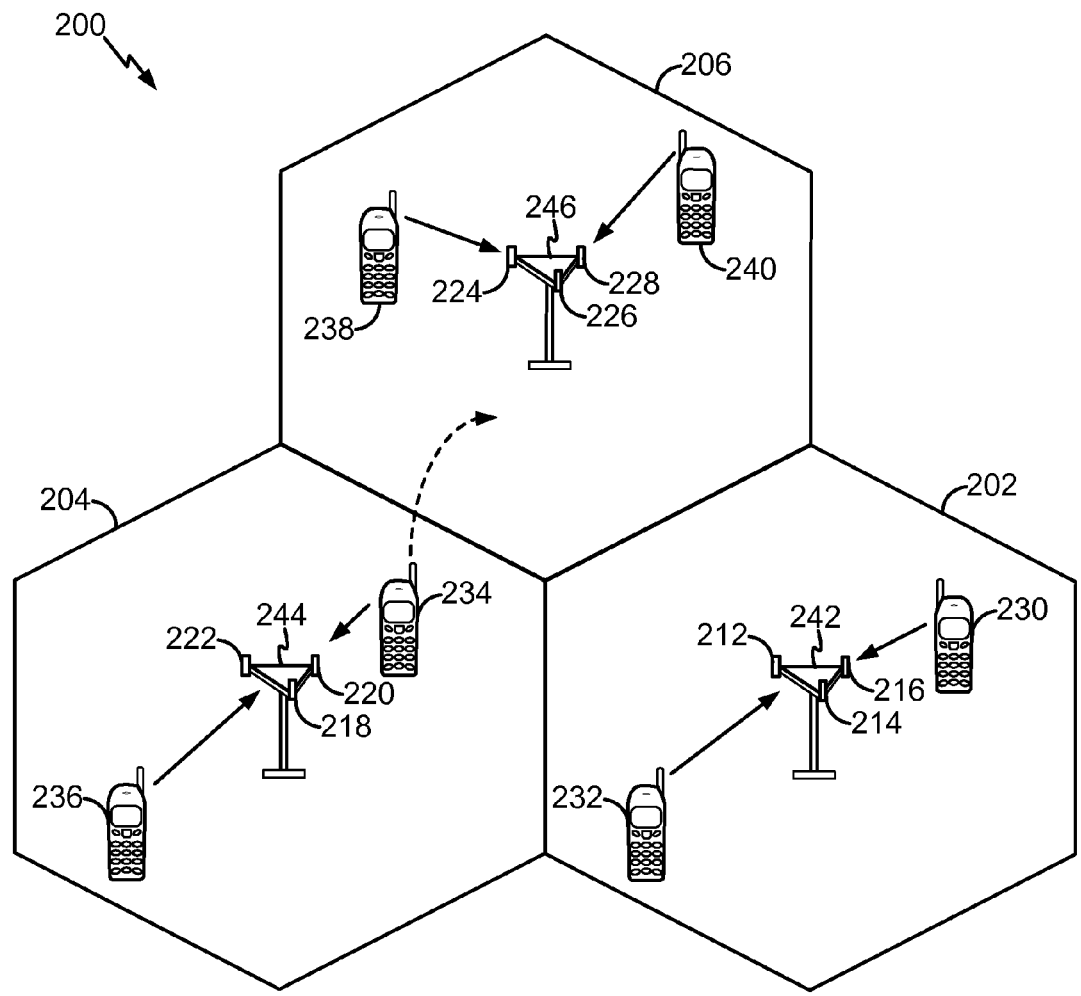
FIG. 2 illustrates a block diagram of an access network.

FIG. 2 illustrates an access network 200 in a UTRAN architecture according to one aspect of the disclosure. The multiple access wireless communication system includes multiple cellular regions (cells), including cells 202, 204, and 206, each of which may include one or more sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. Similarly, in cell 206, antenna groups 224, 226, and 228 each correspond to a different sector. The cells 202, 204 and 206 may include a plurality of UEs that may be in communication with one or more sectors of each cell 202, 204 or 206. For example, UEs 230, 232 may be in communication with Node B 242, UEs 234, 236 may be in communication with Node B 244, and UEs 238, 240 may be in communication with Node B 246. Here, each Node B 242, 244, 246 is configured to provide an access point to a CN 104 (see FIG. 1) for all the UEs 230, 232, 234, 236, 238, 240 in the respective cells 202, 204, and 206.

As the UE 234 moves from the illustrated location in cell 204 into cell 206, a serving cell change (SCC) or handover may occur in which communication with the UE 234 transitions from the cell 204, which may be referred to as the source cell, to cell 206, which may be referred to as the target cell. Management of the handover procedure may take place at the UE 234, at the Node Bs corresponding to the respective cells, at a radio network controller 106 (see FIG. 1), and/or at another suitable node in the wireless network. For example, during a call with the source cell 204, or at any other time, the UE 234 may monitor various parameters of the source cell 204 as well as various parameters of neighboring cells such as cells 206 and 202. Further, depending on the quality of these parameters, the UE 234 may maintain communication with one or more of the neighboring cells. During this time, the UE 234 may maintain an active set, that is, a list of cells that the UE 234 is simultaneously connected to (i.e., the UTRA cells that are currently assigning a downlink dedicated physical channel DPCH or fractional downlink dedicated physical channel F-DPCH to the UE 234 may constitute the active set).

The modulation and multiple access scheme employed by the access network 200 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 3:
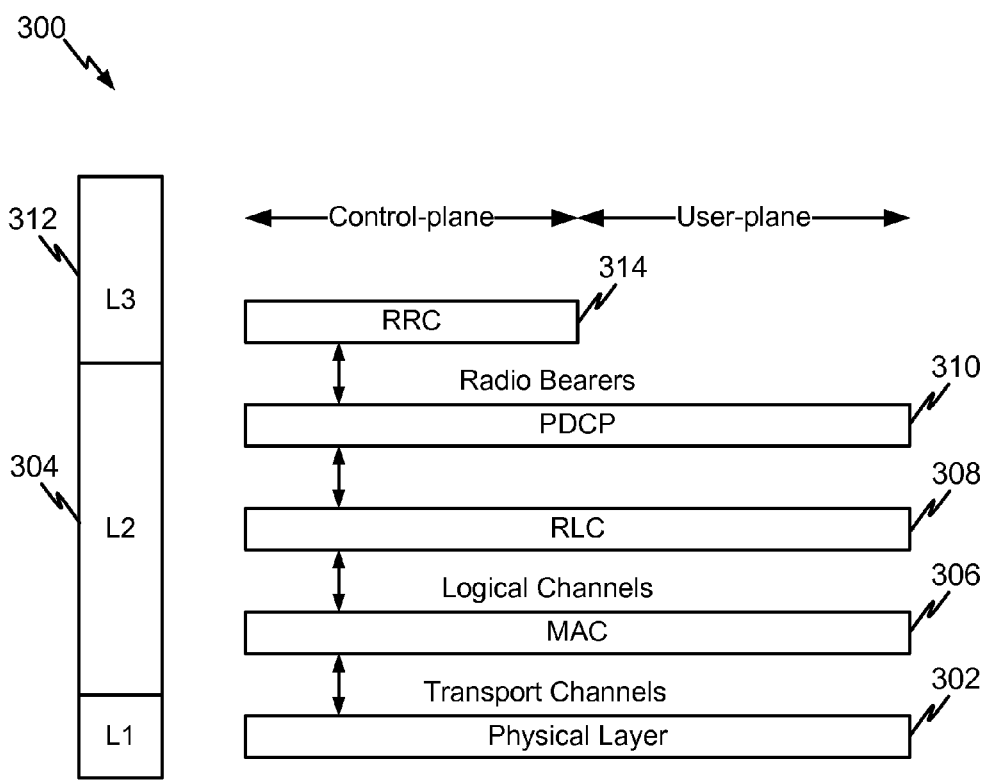
FIG. 3 illustrates a radio protocol architecture for a user and control plane.

The radio protocol architecture may take on various forms depending on the particular application. FIG. 3 is a conceptual diagram illustrating an example of a radio protocol architecture 300 for an HSPA system for a user and control planes. The radio protocol architecture for the UE and Node B is shown with three layers: L1 layer, L2 layer, and L3 layer. L1 layer is the lowest lower and implements various physical layer signal processing functions. L1 layer may be the physical layer 302. The L2 layer 304 is higher up than the physical layer 302 in the hierarchy of layers and may be responsible for the link between the UE and Node B over the physical layer 302.

In the user plane, the L2 layer 304 includes a media access control (MAC) sublayer 306, a radio link control (RLC) sublayer 308, and a packet data convergence protocol (PDCP) 310 sublayer, which may be terminated at the Node B on the network side. Although not shown, the UE may have several upper layers above the L2 layer 304 including a network layer (e.g., IP layer) that is terminated at a PDN gateway on the network side, and an application layer that is terminated at the other end of the connection (e.g., far end UE, server, etc.).

The PDCP sublayer 310 provides multiplexing between different radio bearers and logical channels. The PDCP sublayer 310 also provides header compression for upper layer data packets to reduce radio transmission overhead, security by ciphering the data packets, and handover support for UEs between node Bs. The RLC sublayer 308 provides segmentation and reassembly of upper layer data packets, retransmission of lost data packets, and reordering of data packets to compensate for out-of-order reception due to hybrid automatic repeat request (HARM). The MAC sublayer 306 provides multiplexing between logical and transport channels. The MAC sublayer 306 is also responsible for allocating the various radio resources (e.g., resource blocks) in one cell among the UEs. The MAC sublayer 306 is also responsible for HARQ operations. The L3 layer 312 includes the radio resource control (RRC) 314 protocol that handles the control plane signaling between the UE and the UTRAN. It may perform one or more of the following actions: broadcast system information; radio bearer establishment/reconfiguration and release; RRC connection mobility procedures; paging notification and release; and outer loop power control.

Figure 4:
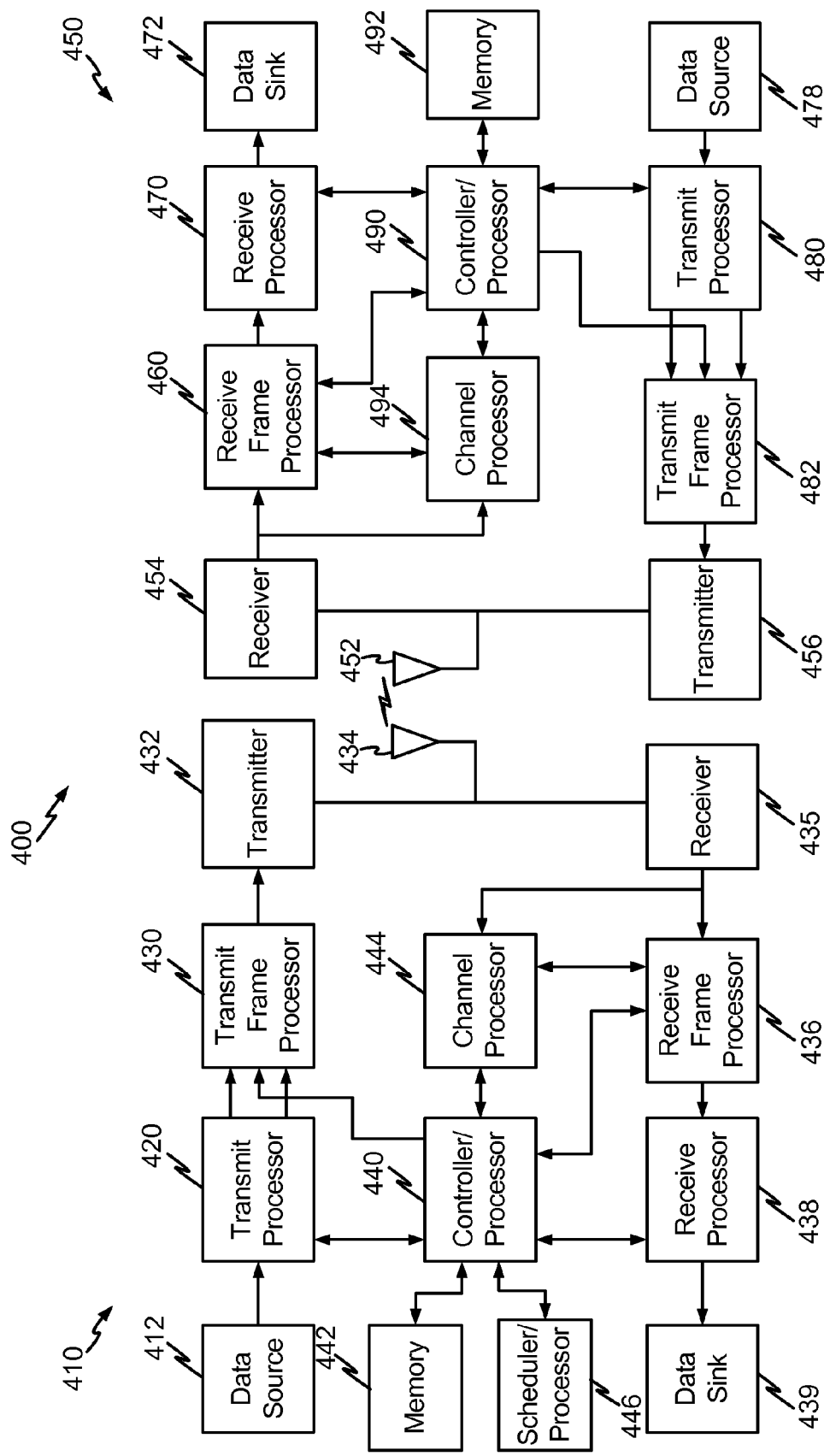
FIG. 4 illustrates a block diagram of a Node B in communication with a user equipment in a telecommunications system.

FIG. 4 is a block diagram of a Node B 410 in communication with a UE 450 according to one aspect of the disclosure. For example, the Node B 410 may be the Node B 108 in FIG. 1, and the UE 450 may be the UE 110 in FIG. 1. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450. The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 440, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an ACK and/or NACK protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

Alignment of Tasks Based on Discontinuous Reception Periods

As described above, discontinuous reception (DRX) is a power-saving feature in wireless technologies (HSPA+, LTE, etc.) where a UE monitors only a subset of downlink channels over specified time intervals. The UE and its associated network may negotiate the specified time intervals during which data transfers relevant to the UE may occur. When the UE monitors the subset of downlink channels over the specified time intervals, the UE's receiver circuitry may be enabled. At other times when the UE is not monitoring the downlink channels, the UE may completely or partially power down the receiver circuitry to reduce current usage and increase battery life.

As used throughout this disclosure, the term "enabled" with respect to circuitry means that the enabled circuitry is powered on and available for operation. By contrast, circuitry that is powered off or is otherwise in a "sleep mode" (i.e., a low power mode where the circuitry has limited operability) is not considered enabled. For example, receiver circuitry may be considered enabled when it is powered on and ready/capable of receiving signals. Receiver circuitry may also include circuitry used for despreading, demodulation, channel estimation, and/or channel decoding.

Specifically, in 3GPP UMTS Release 7 continuous packet connectivity discontinuous reception (CPC-DRX), the UE is specified to monitor certain downlink channels (e.g., HSDPA channels) during certain times. The UE may follow two rules to determine when to monitor HSDPA downlink channels. First, if the number of a particular subframe matches a certain modular arithmetic rule, the UE should monitor the downlink channels during that subframe. This is referred to as a "DRX cycle." For example, if the DRX cycle variable, UE_DRX_Cycle, is equal to four (4), the UE will monitor every fourth subframe. Second, if something is received on the downlink channel intended for the UE during a monitored subframe, there may be a secondary timer that may extend the time during which the channel is monitored. This timer extension can be configurable and last, for example, for 0, 1, 2, 4, 8, 16, 32, 64, 128, 256, or 512 subframes. This is called the inactivity threshold for the DRX cycle. Otherwise, the UE may not be required to monitor HSDPA downlink channels.

According to 3GPP UMTS Release 7 CPC-DRX specifications, the monitoring of the HS-SCCH and HS-PDSCH subframes in the HS-SCCH and HS-PDSCH reception patterns is known based on the continuous packet connectivity (CPC) configuration, as defined in Section 6C.3 of 3GPP TS 25.214 Release 7, incorporated herein by reference. This monitoring is generally independent of network activity. For example, the HS-SCCH and HS-PDSCH may be monitored every UE_DRX_Cycle subframes, which may be configured to be one of 4, 5, 8, 10, 16, or 20 subframes. Other requirements for downlink channel monitoring is generally dependent on either uplink or downlink activity.

Figure 5:
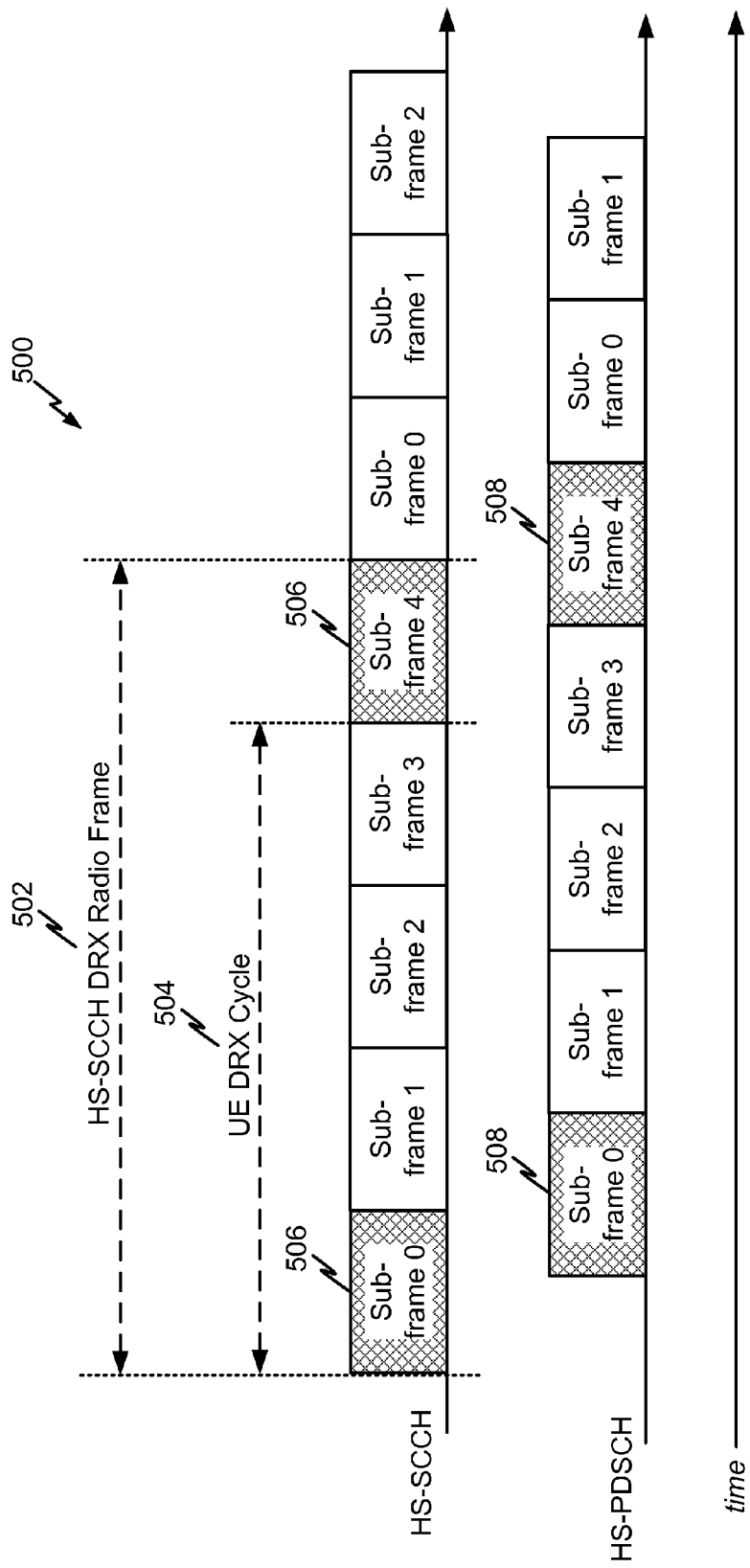
FIG. 5 illustrates the high speed shared control channel reception pattern for an exemplary 2 ms enhanced dedicated channel transmission time interval with discontinuous reception enabled.

FIG. 5 illustrates the HS-SCCH reception pattern for an exemplary 2 ms enhanced dedicated channel (E-DCH) transmission time interval (TTI) with DRX enabled. The example shown in FIG. 5 illustrates an HS-SCCH discontinuous reception (DRX) radio frame 502 having five (5) subframes, and a DRX cycle 504 equal to four (4) (i.e., UE_DRX_cycle=4). Thus, every fourth subframe 506 of the HS-SCCH reception pattern is monitored by the UE for data from the network that is relevant to the UE. Similarly, every fourth subframe 508 of the HS-PDSCH reception pattern may also be monitored if indicated on the corresponding HS-SCCH. (As described above, HS-PDSCH subframes may be generally aligned to begin two slots later than the corresponding HS-SCCH subframes so that the UE may receive control information provided on the HS-SCCH.) Monitoring of the HS-SCCH subframes 506 generally includes enabling the receiver circuitry.

In addition to monitoring downlink channels over specified time intervals, the UE also performs certain measurement tasks that include but are not limited to searcher tasks. As one example, another measurement task may include decoding of broadcast signaling on the primary common control physical channel (PCC-PCH). Searcher tasks in wireless technologies may be used to detect neighboring cells as well as determine signal strengths in the serving and neighboring cells, possibly across multiple radio access technologies. For example, referring to FIG. 2, the UE 236 may perform a searcher task that includes determining the strengths of various signals received from neighboring Node Bs 244, 246 in adjacent cells 204, 206.

While specifications may standardize some timing requirements of searcher tasks (e.g., maximum detection/measurement reporting intervals), timing of such measurements made by searcher algorithms at the UE are generally implementation specific, and may be performed by the UE at times loosely elected by the UE to some degree.

For UMTS implementations, searcher tasks may include Step 1, Step 2, Step 3 searches, other measurement searches, or alternative but equivalent searches. During Step 1, the UE may use the downlink synchronization channel's (SCH) primary synchronization code to acquire slot synchronization to a cell. During Step 2, the UE may use the SCH's secondary synchronization code to find frame synchronization and identify the code group of the cell found in the Step 1. During Step 3, the UE determines the exact primary scrambling code used by the cell. According to some aspects of the disclosure, searcher tasks may also include a New Additional Step Two Three (NAS-TT) search which may be used to replace Steps 2 and 3. A description of NAS-TT may be found in U.S. Patent Application Publication No. 2010/0232397, the entire contents of which is incorporated by reference herein. In some cases, the receiver circuitry must be powered in order to execute the searcher tasks that utilize the received signals.

In a conventional system, when DRX is configured to be active, a UE generally ensures that the receiver circuitry (and any other associated circuitry) is enabled during times when the UE monitors downlink channels, and also during times when the UE performs searcher tasks. The additional amount of time that searcher tasks require the receiver circuitry to be enabled beyond the amount of time the receiver circuitry is required to be enabled to monitor downlink channels may be broadly defined as searcher overhead. Searcher overhead consumes additional energy and may decrease the battery life of the UE. Therefore, battery life of the UE may be extended if searcher overhead is reduced.

In an aspect of the present disclosure, searcher overhead can be reduced by aligning the tasks in searcher algorithms with times that a UE's receiver circuitry (and other associated circuitry) is enabled for the monitoring of downlink channels associated with the DRX cycle. Searcher overhead may thus be reduced or minimized when searcher tasks are suitably aligned and simultaneously performed with the monitoring of the downlink channels.

Searcher tasks generally do not disrupt the required downlink channel monitoring, and thus simultaneous operation of searcher tasks and downlink channel monitoring may be performed to reduce searcher overhead. Therefore, in one aspect of the present disclosure, at least a portion of a searcher task is aligned to be performed during at least a portion of a DRX downlink channel monitoring interval. As just one example, a searcher task may be aligned to start at substantially the same time that DRX monitoring of an HS-SCCH downlink channel subframe is commenced. This way, execution of the searcher task overlaps in time, at least partially, with the DRX monitoring of the HS-SCCH subframes when receiver circuitry may be enabled. By aligning the searcher tasks as much as possible with the monitoring intervals where the receiver circuitry is already assumed to be enabled, the UE has a greater opportunity to save power by disabling the receiver circuitry when searcher tasks and DRX monitoring of the downlink channel(s) is not performed. Thus, an aspect of this disclosure may provide the UE with more power savings opportunities.

Figure 6:
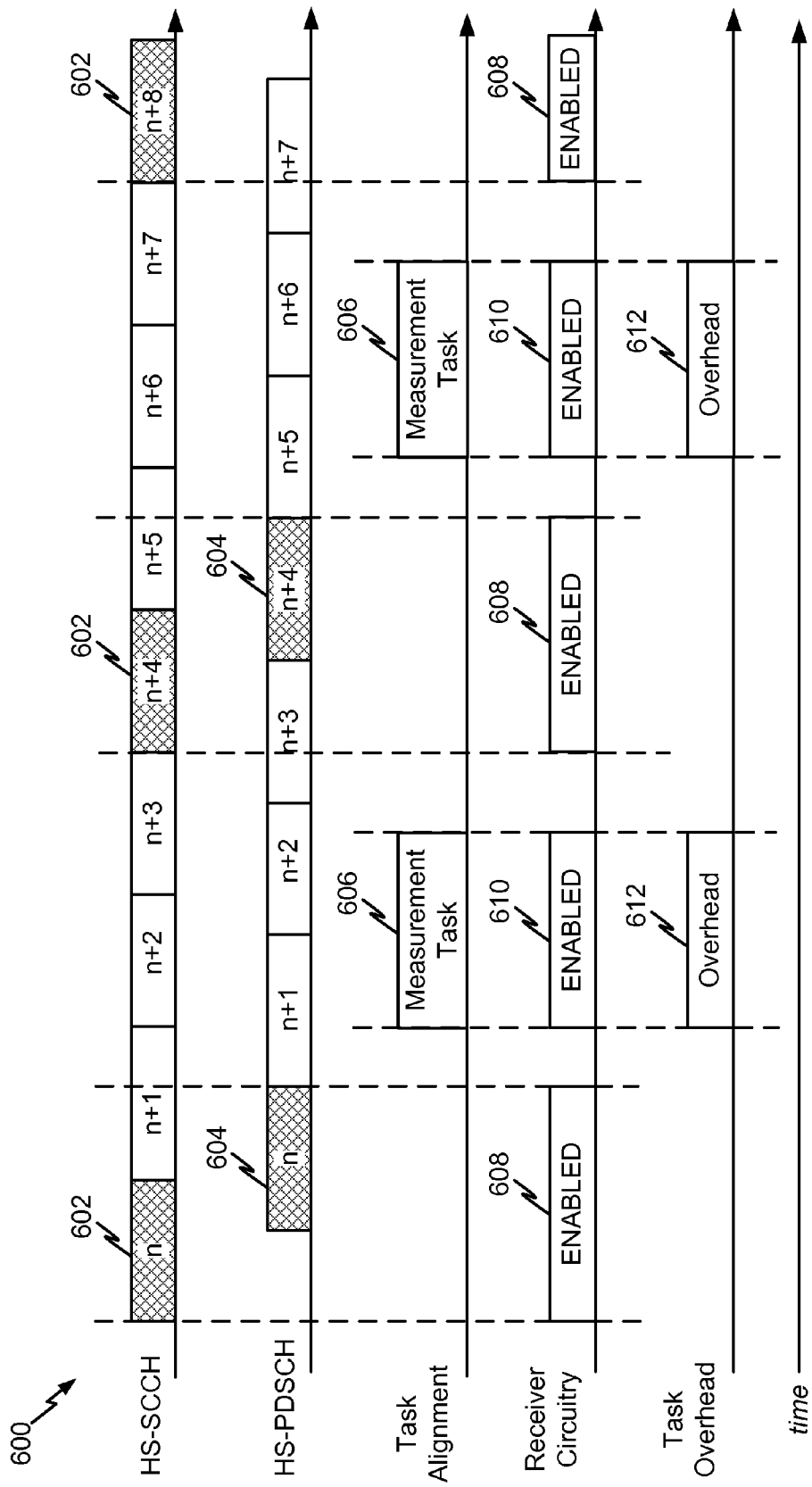
FIGS. 6-9 illustrate timing diagrams of various network signals, along with actions taking place at a user equipment.

FIG. 6 illustrates a timing diagram 600 of various network signals, along with actions taking place at a UE according to one aspect of the disclosure. The CPC-DRX specifications indicate that the UE monitors the HS-SCCH (and the HS-PDSCH if indicated on the corresponding HS-SCCH) corresponding to the subframes in the HS-SCCH reception pattern. In the illustrated example, the DRX cycle is equal to four (4) (i.e., UE_DRX_cycle=4). Thus, the UE monitors every fourth HS-SCCH subframe 602 (i.e., subframes n, n+4, n+8, ...) for data relevant to the UE. For the illustrated example, each monitored HS-SCCH subframe 602 is assumed to indicate that data information is available for the UE in the corresponding HS-PDSCH subframe 604, and thus, the UE also monitors every fourth HS-PDSCH subframe 604 (i.e., subframes n, n+4, n+8, ...). However, in other aspects of the disclosure the HS-PDSCH channel may not be monitored according to DRX. During times when the UE monitors the HS-SCCH subframes 602 and the HS-PDSCH subframes 604, the UE's receiver circuitry is enabled for the duration of the corresponding HS-SCCH subframes 602 and HS-PDSCH subframes 604, and therefore, the receiver circuitry consumes more power than if it were off or in a sleep mode of operation.

The UE also executes one or more measurement tasks 606 (also referred to herein as a "first task"), which may include one or more searcher tasks. In the example shown in FIG. 6, the UE executes the measurement tasks 606 without any particular alignment scheme with respect to the times when the UE is monitoring the HS-SCCH subframes 602 and the HS-PDSCH subframes 604. In other words, the measurement tasks 606 are not aligned with times when the receiver circuitry is already enabled 608 due to DRX monitoring time intervals of the HS-SCCH subframes 602 and HS-PDSCH subframes 604. As a result, execution of the measurement tasks 606 causes the receiver circuitry to be enabled 610 during times when the receiver circuitry may have otherwise been turned off or in a sleep mode of operation. The additional time the receiver circuitry is enabled beyond the time necessary for monitoring of the HS-SCCH and the HS-PDSCH subframes 602, 604, results in task overhead 612. In the cases where the measurements include searcher tasks, the task overhead 612 may be, at least in part, searcher overhead. According to FIG. 6, since the measurement tasks 606 take place during times that are entirely outside the time durations where the HS-SCCH and the HS-PDSCH subframes 602, 604 are monitored, task overhead 612 is relatively large.

Figure 7:
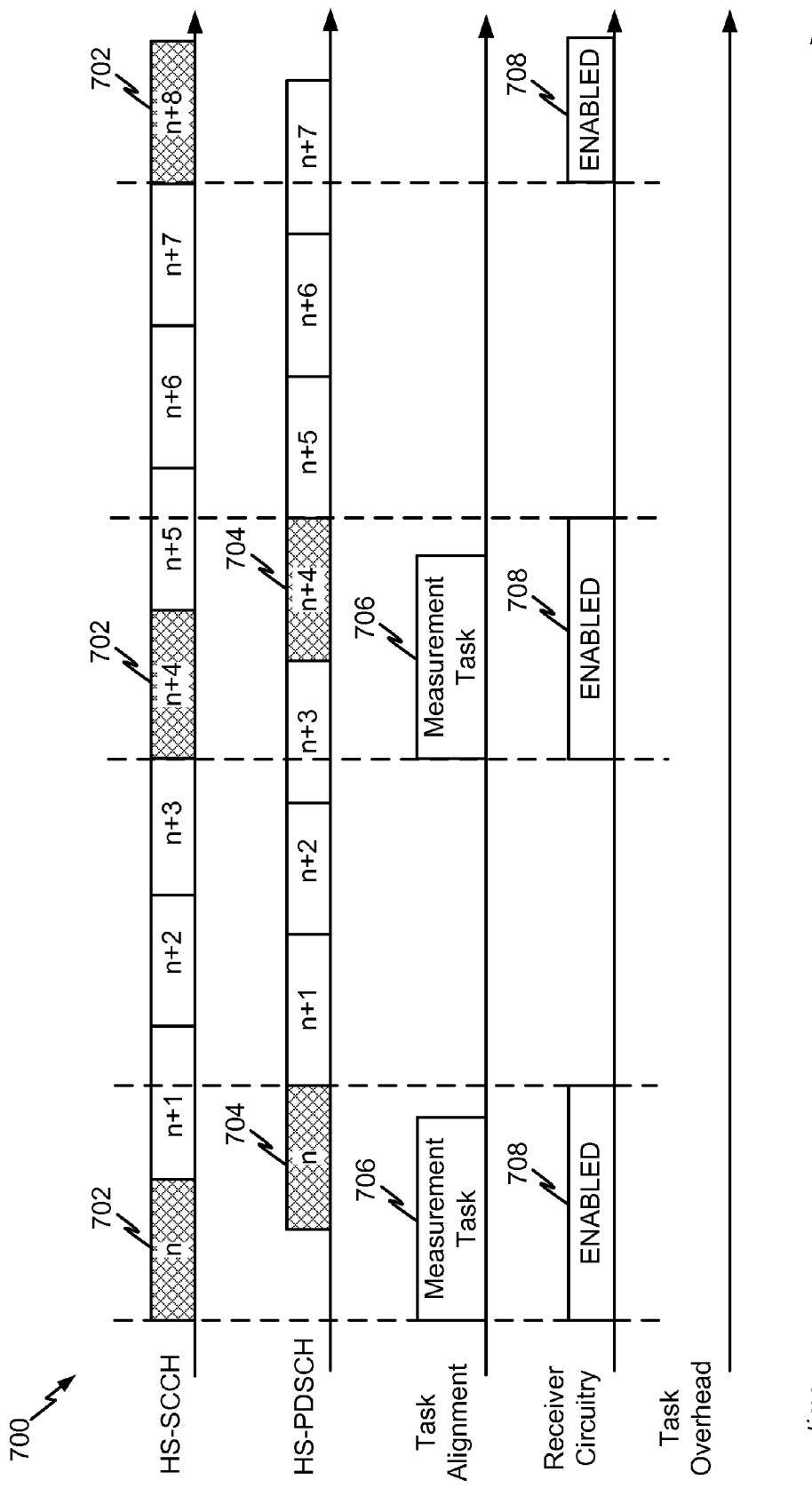

FIG. 7 illustrates a timing diagram 700 of various network signals, along with actions taking place at a UE according to one aspect of the disclosure. In this example, the DRX cycle is also equal to four (4) (i.e., UE_DRX_cycle=4), and thus, the UE monitors every fourth HS-SCCH subframe 702 (i.e., subframes n, n+4, n+8, ...) for data relevant to the UE. For the illustrated example, each monitored HS-SCCH subframe 702 is assumed to indicate that data information is available for the UE in the corresponding HS-PDSCH subframe 704, and therefore, the UE also monitors every fourth HS-PDSCH subframe 704 (i.e., subframes n, n+4, n+8, ...). However, in other aspects of the disclosure the HS-PDSCH channel may not be monitored according to DRX. During times when the UE monitors the HS-SCCH subframes 702 and the HS-PDSCH subframes 704, the UE's receiver circuitry is enabled for the duration of the corresponding HS-SCCH subframes 702 and HS-PDSCH subframes 704, and therefore the receiver circuitry consumes more power than if it were off or in a sleep mode of operation.

The UE also executes one or more measurement tasks 706, which may include one or more searcher tasks. Timing of some measurement tasks, such as searcher tasks, may not be mandated by the UMTS specifications (aside from detection/measurement reporting intervals). Thus, in accordance with an aspect of the present disclosure the searcher tasks may be aligned as desired by the UE. In the example shown in FIG. 7, the UE aligns the measurement tasks 706 to take place (i.e., executes the measurement tasks) during times when the UE is monitoring the HS-SCCH subframes 702 and the HS-PDSCH subframes 704. In other words, the measurement tasks 706 are aligned with times when the receiver circuitry is already enabled 708 due to DRX monitoring time intervals of the HS-SCCH and the HS-PDSCH subframes 702, 704. As a result, task overhead is reduced or eliminated since the execution of the measurement tasks 706 does not cause the receiver circuitry to be enabled beyond times when the receiver circuitry is enabled for DRX downlink channel monitoring. The UE associated with FIG. 7 may consume less power than the UE associated with FIG. 6 since the UE of FIG. 7 aligns its measurement tasks with times when the receiver circuitry is already enabled. In the example shown in FIG. 7, the measurement tasks 706 are aligned so that they are initiated at substantially the same time that monitoring for the subframes 702, 704 begins. Moreover, if the measurement task is short, such as the measurement tasks 704 of FIG. 7, they may be completed within the duration of the HS-SCCH/HS-PDSCH monitoring, then there may be zero task overhead for the measurement task.

Figure 8:
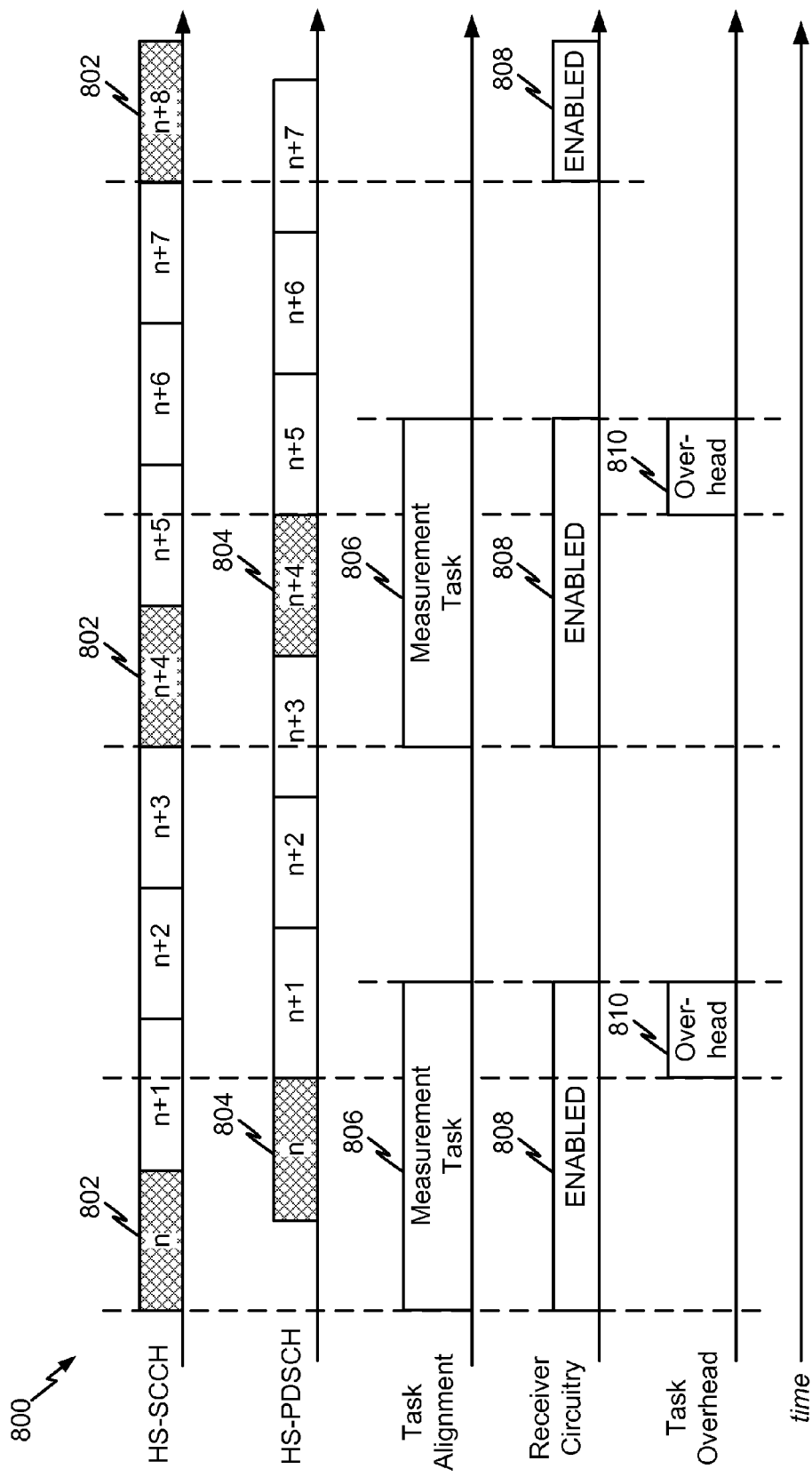

FIG. 8 illustrates a timing diagram 800 of various network signals, along with actions taking place at a UE according to one aspect of the disclosure. The timing diagram 800 of FIG. 8 features a DRX cycle value equal to four (4), such that every fourth subframe of HS-SCCH 802 signal and the HS-PDSCH 804 signal is monitored. (Each monitored HS-SCCH subframe 802 is assumed to indicate that data information is available for the UE in the corresponding HS-PDSCH subframe 804.) Similar to the UE associated with FIG. 7, the UE associated with FIG. 8 aligns execution of the measurement tasks 806 during times when the UE is monitoring the HS-SCCH subframes 802 and the HS-PDSCH subframes 804. However, in this example, the duration of each measurement task 806 exceeds the duration of the time that the UE monitors an HS-SCCH subframe 802 and an HS-PDSCH subframe 804. Therefore, the receiver circuitry may remain enabled 808 for an additional period of time beyond the period of time used to complete the monitoring of the HS-SCCH subframes 802 and the HS-PDSCH subframes 804. However, the task overhead 810 associated with this additional period of time is still less than an otherwise equivalent UE that does not align measurement tasks with DRX downlink channel monitoring (e.g., see FIG. 6). In the example shown in FIG. 8, the measurement tasks 806 are aligned so that they are initiated at substantially the same time that monitoring of the subframes 802, 804 begin.

Figure 9:
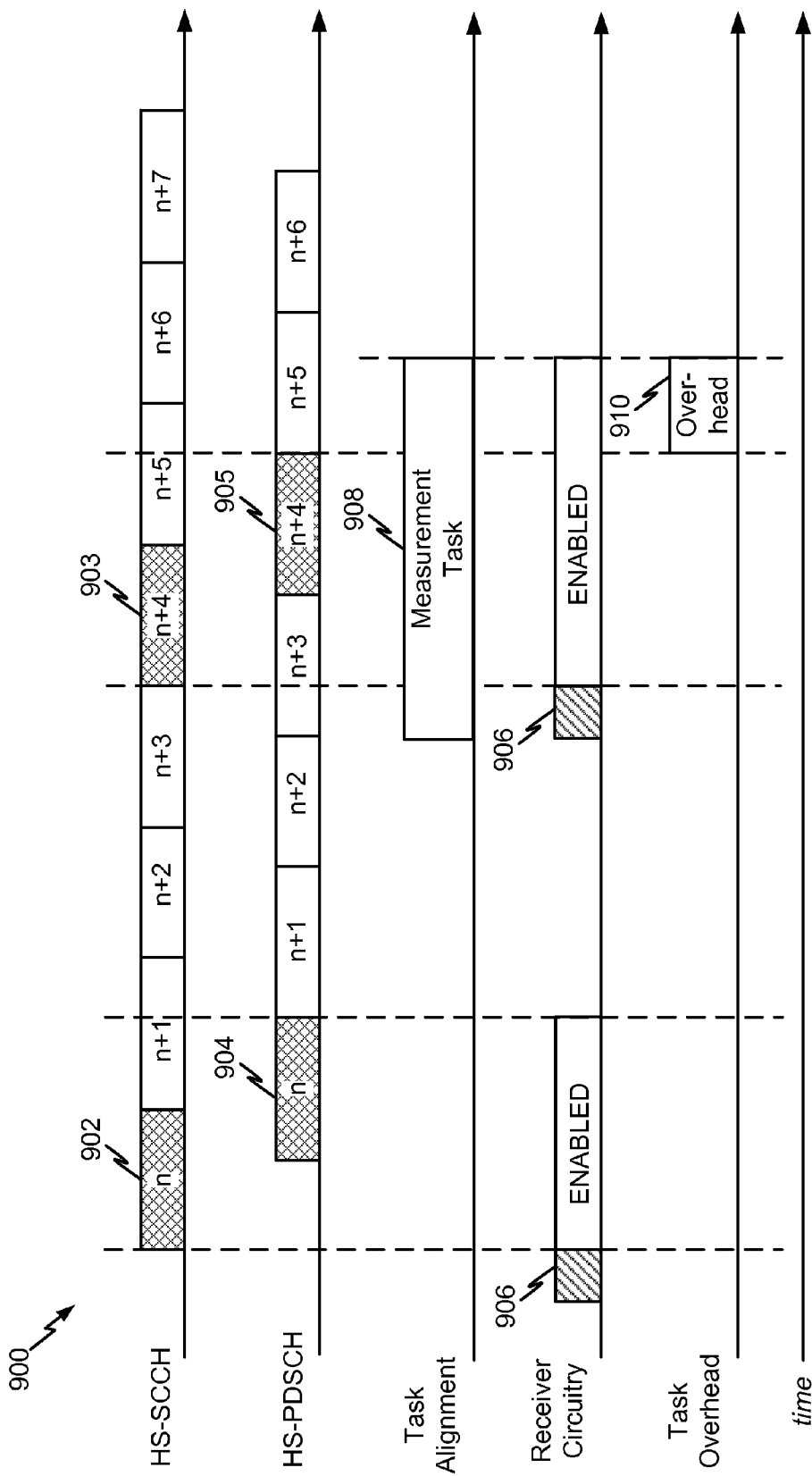

FIG. 9 illustrates a timing diagram 900 of various network signals, along with actions taking place at a UE according to one aspect of the disclosure. In this example, the DRX cycle is equal to four (4) (i.e., UE_DRX_cycle=4). Thus, the UE monitors every fourth HS-SCCH subframe 902, 903 (i.e., subframes n, n+4, n+8, ... ) for data relevant to the UE. For the illustrated example, each monitored HS-SCCH subframe 902, 903 is assumed to indicate that data information is available for the UE in the corresponding HS-PDSCH subframe 904, 905, and thus, the UE also monitors every fourth HS-PDSCH subframe 904, 905 (i.e., subframes n, n+4, n+8, ... ). Similar to the UEs of the prior timing diagrams 600, 700, 800, during times when the UE monitors the HS-SCCH subframes 902, 903 and the HS-PDSCH subframes 904, 905, the UE's receiver circuitry is enabled and thus the receiver circuitry consumes more power than if it were off or in a sleep mode of operation. However, in this example, the UE's receiver circuitry is also enabled for a period of time 906 before the UE actually begins monitoring the HS-SCCH subframes 902, 903 and/or the HS-PDSCH subframes 904, 905. Thus, the receiver circuitry is enabled in anticipation of DRX monitoring of the downlink channel subframes 902, 903, 904, 905. This additional "warm up" time 906 may be utilized to initialize the receiver circuitry. In another aspect of the present disclosure, the period of time 906 before the UE begins monitoring the HS-SCCH subframes 902, 903 corresponds to one or more time slots (e.g., two (2) slots) used to monitor an enhanced absolute grant control downlink channel (E-AGCH). According to one aspect, the additional time 906 is utilized for the DRX monitoring of the subframes 902, 903, 904, 905, and is not considered task overhead.

The UE of FIG. 9 also executes a measurement task 908, which may include a searcher task. In the example illustrated, the UE aligns execution of a measurement task 908 during a time when the receiver circuitry is enabled in anticipation of DRX monitoring of the HS-SCCH and/or the HS-PDSCH subframes 903, 905. Thus, the measurement task 908 is aligned so that it is initiated at some time before monitoring of the subframes 903, 905 begins. Task overhead 910 is reduced since the execution of the measurement task 908 during times when the receiver circuitry is not enabled for DRX downlink channel monitoring is lessened. The UE associated with FIG. 9 may consume less power than an otherwise equivalent UE that does not align measurement tasks with DRX downlink channel monitoring (e.g., see FIG. 6).

Figure 10:
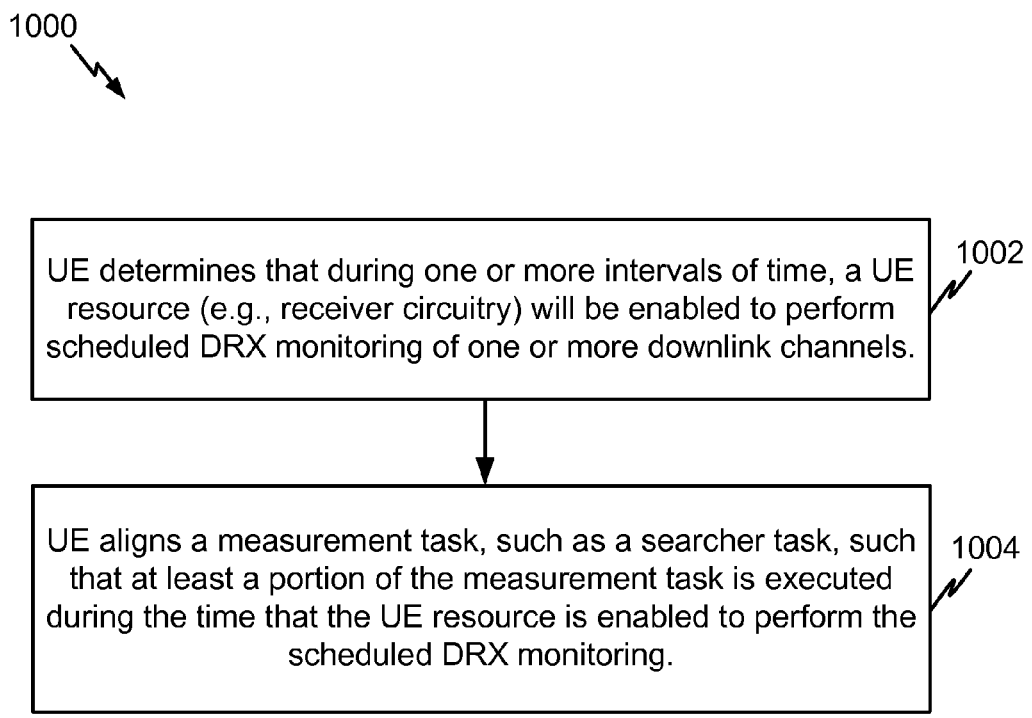
FIG. 10 illustrates a flow chart featuring a method operational at a user equipment.

FIG. 10 illustrates a flow chart 1000 featuring an exemplary method operational at a UE in accordance with certain aspects of the present disclosure. In step 1002, the UE determines that during one or more intervals of time, a UE resource (e.g., receiver circuitry) will be enabled to perform scheduled DRX monitoring of one or more downlink channels (e.g., HS-SCCH). In step 1004, the UE aligns a measurement task, such as a searcher task, such that at least a portion of the measurement task is executed during the time that the UE resource is enabled to perform the scheduled DRX monitoring. Since the UE knows in advance that certain resources will be enabled for scheduled DRX monitoring of one or more downlink channels, it can align measurement tasks to be executed—at least in part—during those times the resources are enabled. In this way, if the measurement task is a searcher task, searcher overhead may be reduced.

Enhanced DRX with cell forward access channel (CELL_FACH) is defined in 3GPP UMTS Release 8 Enhanced DRX specifications. The concept is similar to CPC-DRX cell dedicated channel (CELL-DCH) described above, but the DRX on-times (i.e., the times during which one or more downlink channels' subframes are monitored) are more spread apart. Similarly, the required monitoring of HS-SCCH and HS-PDSCH during the subframes in the HS-SCCH reception pattern for Enhanced DRX in CELL_FACH state is known based on enhanced DRX configuration, as defined in Section 8.5.49 of 3GPP TS 25.331 Release 8, incorporated herein by reference. This monitoring is generally independent of network activity. The HS-SCCH and HS-PDSCH (if required) are monitored in Rx_burst frames out of every DRX_cycle frames. Here, Rx_burst is the period in frames within the DRX cycle, in which the UE receives HS-DSCH, signaled by the parameter "HS-DSCH Rx_burst$_{FACH}$." In substantially the same manner as described above with respect to FIGS. 7-9, measurement tasks, including searcher tasks, can be aligned during periods where the HS-SCCH and HS-PDSCH (if required) are monitored in Rx_burst frames. The alignment of measurement tasks during times when downlink channels are monitored may also be extended to IDLE mode DRX, in which the DRX on-times are spaced even further apart than those in CELL_FACH state.

During periods of network activity, the UE may be specified to monitor more downlink channels during time intervals outside those during periods of inactivity. That is, one or more timer parameters may be initialized when information is received during the DRX channel monitoring interval, and the channel monitoring may continue until the expiration of the timer, such that that particular interval extends beyond the normal DRX time period. In 3GPP UMTS Release 7 CPC-DRX (e.g., 3GPP TS 25.214), two such parameters include Inactivity_Threshold_for_UE_Grant_Monitoring and Inactivity_-Threshold_for_UE_DRX_Cycle. In 3GPP UMTS Release 8 Enhanced DRX (e.g., 3GPP 25.331), one such parameter is the T321 timer. In these instances, the UE monitors downlink channels over the duration of the timers. The counters for these timers may restart during this duration if further network activity continues.

In an aspect of the present disclosure, the UE may take into account the state of the timer counters and issue searcher tasks during these additional monitoring periods, in addition to the searcher tasks aligned with scheduled DRX monitoring of the downlink channels. In this way, the alignment of searcher tasks may be dynamically aligned in accordance with knowledge of an extended monitoring interval.

Figure 11:
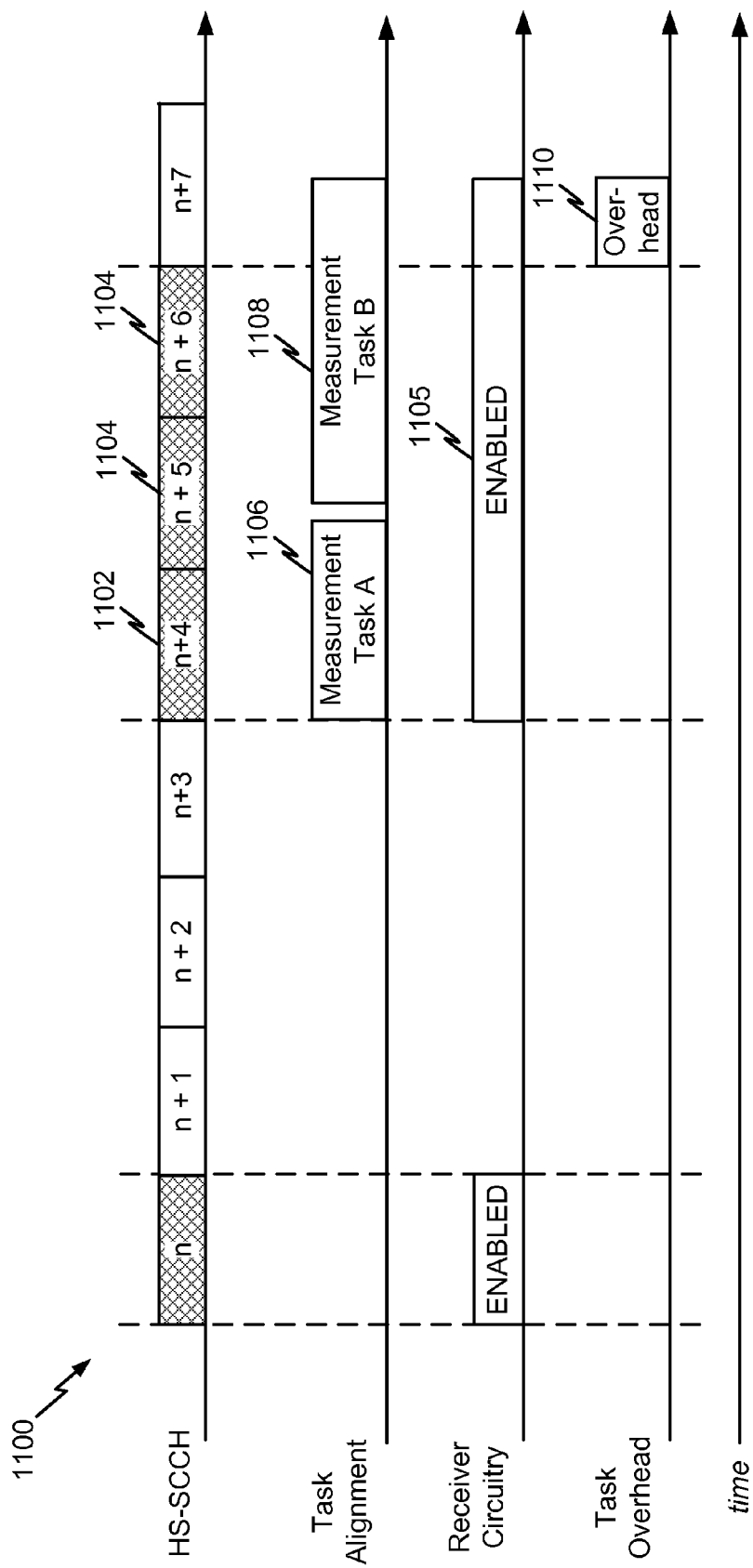
FIG. 11 illustrates a timing diagram of a high speed shared control channel network signal, along with various actions taking place at a user equipment.

FIG. 11 illustrates a timing diagram 1100 of an HS-SCCH network signal, along with actions taking place at a UE according to one aspect of the disclosure. In this example, the DRX cycle is equal to four (4) (i.e., UE_DRX_cycle=4), and thus the UE monitors every fourth HS-SCCH subframe (i.e., subframes n, n+4, n+8, ... ) for data relevant to the UE. In this example, a timer (herein also referred to as an "inactivity threshold timer") is initiated after the UE detects information relevant to the UE while monitoring an HS-SCCH subframe 1102. The timer causes the UE to monitor additional HS-SCCH subframes 1104 for additional information relevant to the UE. The HS-SCCH channel monitoring may continue until the expiration of the timer, and thus the number of subframes monitored (in this case three (3)) may extend beyond the regular number of subframes monitored during another DRX cycle (for example, one (1) subframe). The receiver circuitry remains enabled 1105 during the time that the subframes 1102, 1104 are monitored.

The UE of FIG. 11 also executes measurement tasks 1106, 1108, which may include one or more searcher tasks. In the example shown in FIG. 11, the UE aligns execution of measurement task A 1106 at substantially the same time the UE is scheduled to monitor the HS-SCCH subframe 1102 according to the DRX cycle in order to reduce task overhead (e.g., searcher overhead) associated with measurement task A. In addition, once the timer is initiated after the UE detects information relevant to the UE while monitoring the subframe 1102, the UE may align execution of measurement task B 1108 to take place during the interval of time where the additional HS-SCCH subframes 1104 are being monitored. In the example shown in FIG. 11, measurement task B 1108 is longer in duration than the time it takes to monitor the subframes 1104, and thus there is some task overhead 1110 associated with measurement task B 1108. However, energy is still conserved by aligning a portion of measurement task B 1108 to take place during a time when the receiver circuitry was already enabled for DRX monitoring of the HS-SCCH downlink channel subframes 1104.

According to one aspect of the disclosure, the UE may be notified whenever the timer is initiated so that the UE can align a measurement task to execute during the time the additional downlink channel subframes 1104 are monitored. The UE may also be notified of the actual length (e.g., in time, or by the number of subframes, etc.) of the timer so that it can align one or more measurement tasks accordingly. For example, if the UE is notified that the timer having a length equal to six (6) subframes is initiated, then the UE can align or more measurement tasks to be executed during that six (6) subframe extended period. If all the measurement tasks so aligned complete before the expiration of the timer, then the task overhead may be zero since the receiver circuitry would have been enabled during that time to monitor the subframes notwithstanding the alignment of the measurement tasks.

Figure 12:
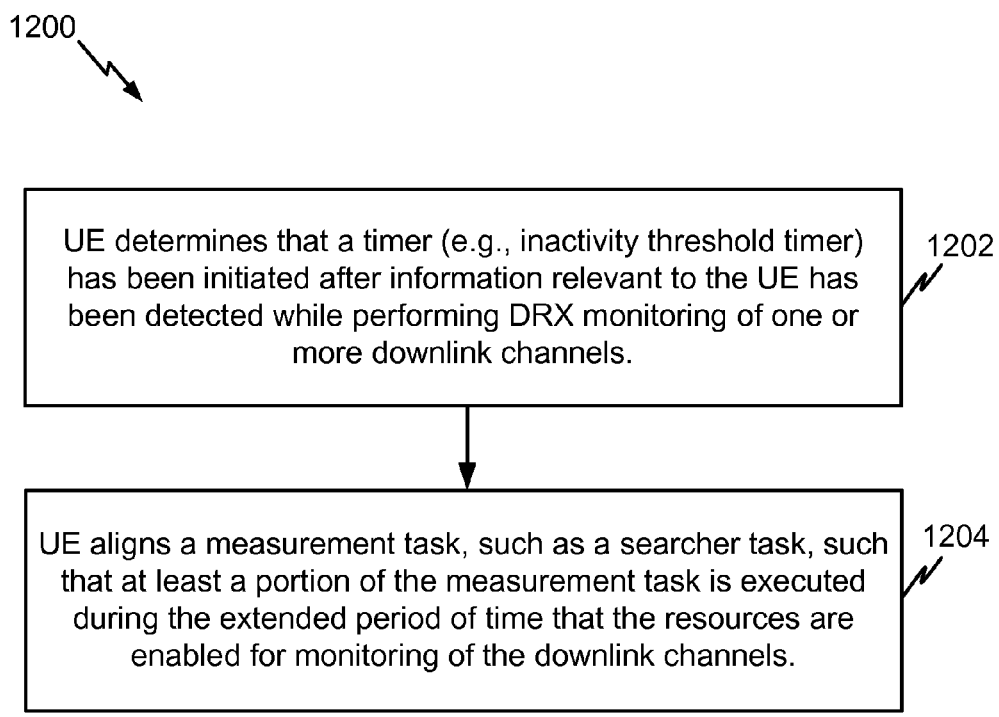
FIGS. 12 and 13 illustrate flow charts featuring methods operational at a user equipment.

FIG. 12 illustrates a flow chart 1200 featuring an exemplary method operational at a UE in accordance with certain aspects of the present disclosure. In step 1202, the UE determines that a timer (e.g., inactivity threshold timer) has been initiated after information relevant to the UE has been detected while performing DRX monitoring of one or more downlink channels. For example, this determination may occur after a task scheduler of the UE is notified that the inactivity threshold timer has been initiated. The task scheduler of the UE may be responsible for aligning and/or scheduling measurement tasks, including searcher tasks. As another example, the determination may occur after the task scheduler checks (as one example it may check periodically) the state of the timer. The timer extends the period of time during which the resources are enabled for additional monitoring of the downlink channels. In step 1204, the UE aligns a measurement task, such as a searcher task, such that at least a portion of the measurement task is executed during the extended period of time that the resources are enabled for monitoring of the downlink channels. In this way, the UE may dynamically align measurement tasks to be executed—at least in part—during times when resource enablement is extended due to the initiation of a timer after DRX monitoring of one or more downlink channels reveals information relevant to the UE.

Figure 13:
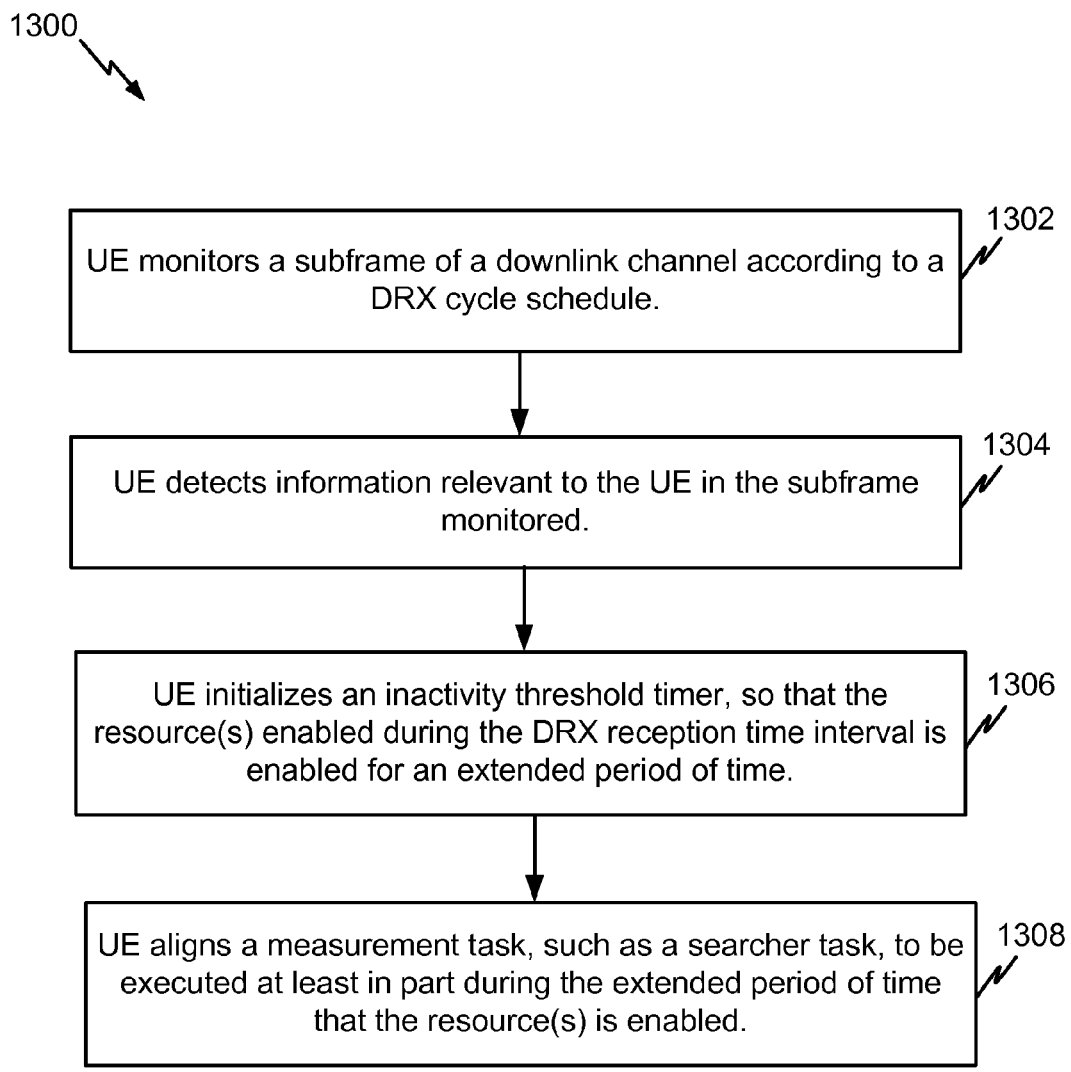

FIG. 13 illustrates a flow chart 1300 featuring an exemplary method operational at a UE in accordance with certain aspects of the present disclosure. In step 1302, the UE monitors a subframe of a downlink channel according to a DRX cycle schedule. At step 1304, the UE detects information relevant to the UE in the subframe monitored. At step 1306, the UE initializes an inactivity threshold timer, so that the resource(s) enabled during the DRX reception time interval is enabled for an extended period of time. At step 1308, the UE aligns a measurement task, such as a searcher task, to be executed at least in part during the extended period of time that the resource(s) is enabled.

Exemplary User Equipment

Figure 14:
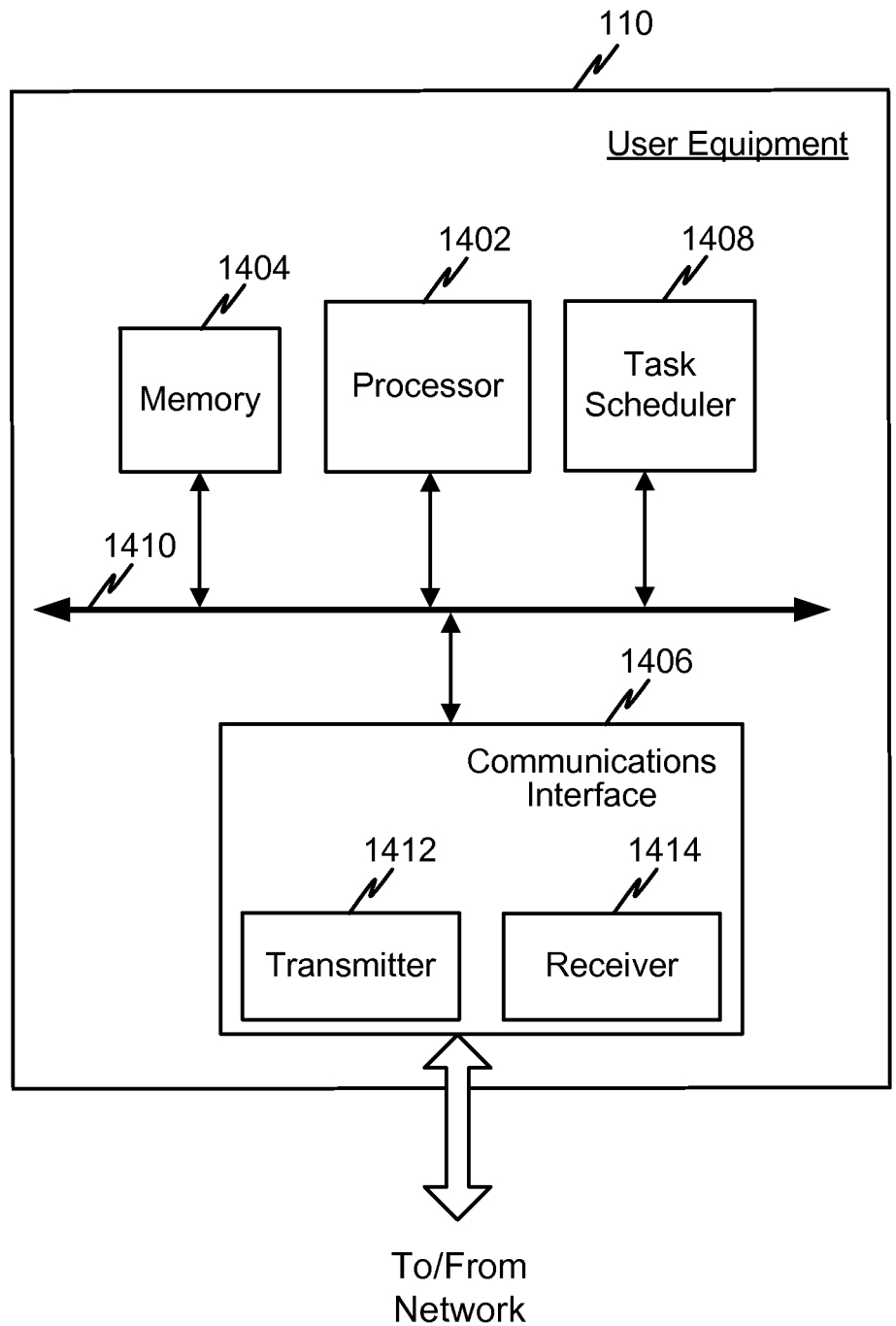
FIG. 14 illustrates a functional block diagram of a user equipment.

FIG. 14 illustrates a functional block diagram of the user equipment (UE) 110 according to one aspect of the present disclosure. The UE 110 may include a processor (e.g., processing circuit(s)) 1402, a memory (e.g., memory circuit(s)) 1404, a communications interface 1406, and/or a task scheduler 1408. All or some of these components may communicate with one another via a bus 1410. The communications interface 1406 may include, among other components, a transmitter 1412 and a receiver 1414.

The processor 1402 may be adapted to process data and perform some or all of the UE operations described above with respect FIGS. 1-13 and 15. For example, the processor 1402 may perform DRX monitoring of the downlink channels, align measurement tasks, initiate inactivity threshold timers, determine the state of said timers, and enable/disable resources of the UE including the receiver 1414. The memory 1404 is adapted to store data. The memory 1404 may be volatile memory and/or non-volatile memory, including but not limited to DDR SDRAM, FLASH memory, one time programmable read only memory (ROM), etc. The memory 1404 is adapted to store data received from and/or transmitted to the network. It may also store the state of an inactivity threshold timer, as well as measurement tasks.

The communications interface 1406 allows the UE to communicate with the network. The transmitter 1412 includes circuitry that transmits signals, such as UMTS signals, to the network. It may also include any circuitry used for spreading, modulation, and channel encoding. The receiver 1414 includes circuitry that receives signals, such as UMTS signals, from the network. It may also include any circuitry used for despreading, demodulation, channel estimation, and channel decoding. The task scheduler 1408 may be part of the processor 1402, or in some aspects it may be independent from the processor 1402. The task scheduler 1408 may be adapted to align and/or schedule measurement tasks, including searcher tasks. It may also receive notification that an inactivity threshold timer has been initiated, and/or periodically check the state of the timer.

Method Operational at User Equipment

Figure 15:
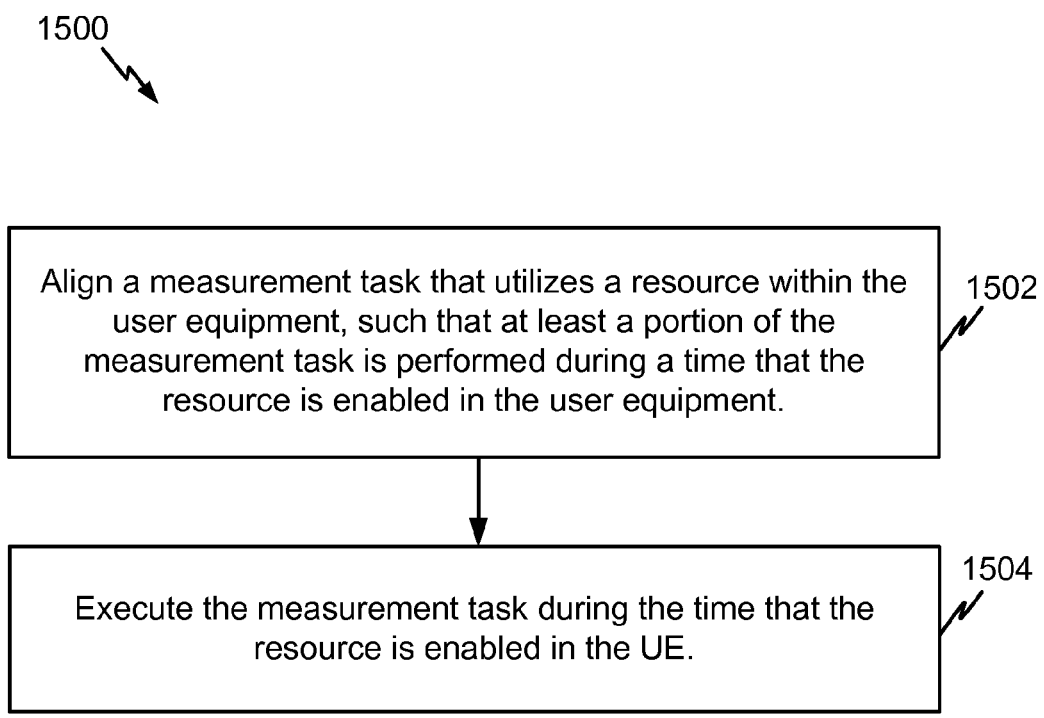
FIG. 15 illustrates a flow chart featuring a method operational at a user equipment.

FIG. 15 illustrates a flow chart 1500 featuring an exemplary method operational at a UE in accordance with certain aspects of the present disclosure. At step 1502, the UE aligns a measurement task that utilizes a resource within the UE, such that at least a portion of the measurement task is performed during a time that the resource is enabled in the UE. At step 1504, the UE executes the measurement task during the time that the resource is enabled in the UE.

Additional Aspects

In one aspect of the disclosure, timing of some measurement tasks, such as searcher tasks, is not mandated by the UMTS specifications (aside from detection/measurement reporting intervals), and thus, in accordance with an aspect of the present disclosure, searcher tasks may be aligned by the UE as illustrated in FIGS. 7-13, 15, 16, and 17. Alignment of the searcher tasks can be programmed in advance since it only depends on the UE continuous packet connectivity (CPC) parameter configuration and is independent of network activity. For example, when CPC-DRX or FACH-DRX is configured, there may be a specific reception pattern that is to be monitored. These reception patterns are completely known after the UE is provided the DRX configuration parameters. Hence, the UE can align its measurement tasks to be initiated based on the reception pattern.

In one aspect of the disclosure, the duration of a measurement task (e.g., searcher task) may not be completely known in advance of the task's execution. Thus, alignment of such a measurement task to be executed during DRX monitoring of HS-SCCH/HS-PDSCH downlink channels, including any monitoring extension due to inactivity threshold timer initiations, may be considered a best effort solution that reduces task overhead to some degree.

In some aspects of the present disclosure, alignment of measurement tasks, such as searcher tasks, may change how frequently the searcher tasks are performed. Thus, in another aspect of the disclosure, the alignment of the searcher tasks may attempt to keep the same or a similar searcher frequency as utilized in a non-DRX mode, e.g., when DRX is not configured.

In one aspect of the present disclosure, measurement tasks may be aligned based on fractional downlink physical channel (F-DPCH) monitoring. The F-DPCH may be monitored due to continuous packet connectivity discontinuous transmission (CPC-DTX) uplink dedicated physical control channel (DPCCH) bursts (including DPCCH preambles and DPCCH postambles) corresponding to, for example, a DTX Cycle 1 and DTX Cycle 2, which may also be known at the time of CPC configuration. Thus, measurement tasks may be aligned during F-DPCH monitoring to decrease task overhead, such as searcher overhead.

Figure 16:
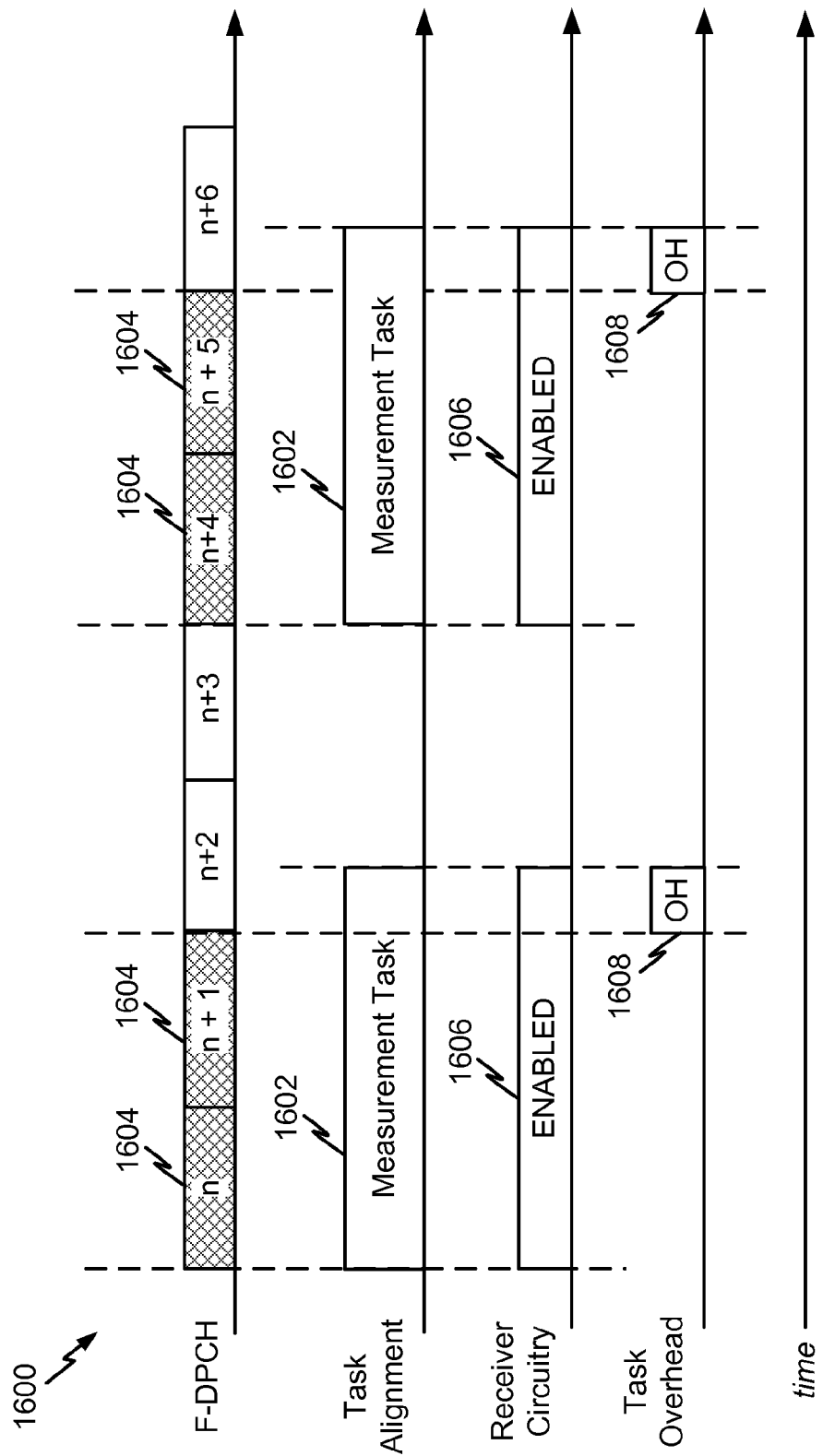
FIG. 16 illustrates a timing diagram of a fractional downlink physical channel network signal, along with various actions taking place at a user equipment.

For example, FIG. 16 illustrates a timing diagram where a measurement task 1602 at a UE is aligned during times when F-DPCH subframes 1604 are monitored due to CPC-DTX DPCCH burst transmissions according to one aspect. Receiver circuitry may be enabled 1606 during times when the F-DPCH subframes are monitored and thus aligning measurement tasks that utilize receiver circuitry with such F-DPCH monitoring helps reduce task overhead 1608 and conserve UE power. In the illustrated example, the duration of each measurement task 1602 exceeds the duration of the time that the UE monitors the F-DPCH subframes 1604. Therefore, the receiver circuitry may remain enabled for an additional period of time beyond the period of time used to complete the monitoring of the F-DPCH subframes 1604. However, the task overhead 1608 associated with this additional period of time is still less than an otherwise equivalent UE that does not align measurement tasks with F-DPCH subframe monitoring due to CPC-DTX DPCCH burst transmissions. In the example shown in FIG. 16, the measurement tasks 1602 are aligned so that they are initiated at substantially the same time that monitoring of the F-DPCH subframes 1604 begin. Similar to the aspects described herein regarding alignment of measurement tasks with HS-SCCH monitoring, the measurement tasks 1602 may instead be aligned so that they begin before (e.g., during any receiver circuitry warm up period) monitoring of the F-DPCH subframes 1604 begins.

Figure 17:
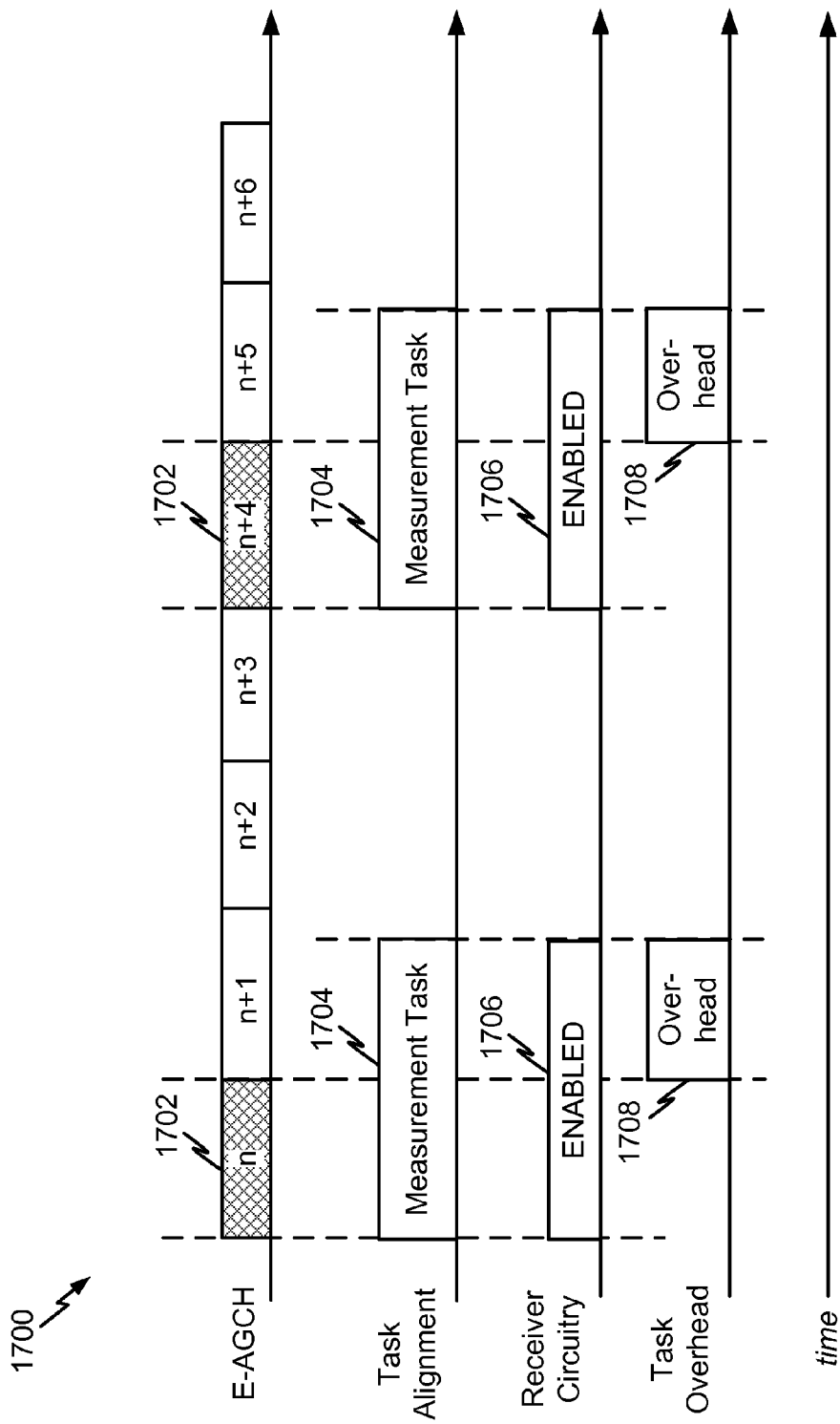
FIG. 17 illustrates a timing diagram of an enhanced absolute grant channel network signal, along with various actions taking place at a user equipment.

According to another aspect of the present disclosure, measurement tasks may be aligned based on monitoring of the enhanced absolute grant downlink channel (E-AGCH). FIG. 17 illustrates a timing diagram 1700 of an E-AGCH network signal, along with actions taking place at a UE according to one aspect of the disclosure. The E-AGCH downlink channel may be monitored according to a DRX cycle. In this example, the DRX cycle is equal to four (4) (i.e., UE_DRX_cycle=4), and thus, the UE monitors every fourth E-AGCH subframe 1702 (i.e., subframes n, n+4, n+8, . . . ). For example, the UE may monitor the E-AGCH two (2) slots before it monitors the HS-SCCH downlink channel. During times when the UE monitors the E-AGCH subframes 1702, the UE's receiver circuitry is enabled for the duration of the corresponding E-AGCH subframes 1702.

The UE executes one or more measurement tasks 1704, which may include one or more searcher tasks. Since timing of some measurement tasks, such as searcher tasks, may not be mandated by the UMTS specifications, the measurement tasks may be aligned so that they are executed during times when the UE is monitoring the E-AGCH subframes 1702. Thus, the measurement tasks 1704 are aligned with times when the receiver circuitry is already enabled 1706 due to DRX monitoring time intervals. In the illustrated example, the duration of each measurement task 1704 exceeds the duration of the time that the UE monitors an E-AGCH subframe 1702. Therefore, the receiver circuitry may remain enabled for an additional period of time beyond the period of time used to complete the monitoring of the E-AGCH subframes 1702. However, the task overhead 1708 associated with this additional period of time is still less than an otherwise equivalent UE that does not align measurement tasks with DRX downlink channel monitoring. In the example shown in FIG. 17, the measurement tasks 1704 are aligned so that they are initiated at substantially the same time that monitoring of the E-AGCH subframes 1702 begin.

According to some aspects of the present disclosure, measurement tasks may be performed consecutively if there are insufficient subframes in the HS-SCCH reception pattern over a given time frame. Performing the tasks consecutively may increase the probability that the tasks' completion time exceeds the duration of the HS-SCCH/HS-PDSCH monitoring. However, the searcher tasks may be nevertheless substantially aligned with HS-SCCH/HS-PDSCH monitoring and thus searcher overhead may be reduced.

Although some of the aspects of the disclosure discussed above may be applicable to 3GPP UMTS Release 7 CPC-DRX in its CELL_DCH state, and 3GPP UMTS Release 8 Enhanced DRX in its CELL_FACH state, which correspond to a W-CDMA air interface, alignment of measurement tasks to be executed, at least in part, during times when UE resource(s) are known to be available may be extended to other standards and technologies incorporating discontinuous reception (DRX).

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

One or more of the components, steps, features and/or functions illustrated in FIGS. 1, 2, 3, 4, 5, 6, 7, 8, 9, 10, 11, 12, 13, 14, 15, 16, and/or 17 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 1, 2, 4, and/or 14 may be configured to perform one or more of the methods, features, or steps described in FIGS. 3, 5, 6, 7, 8, 9, 10, 11, 12, 13, 15, 16, and/or 17. The algorithms described herein may also be efficiently implemented in software and/or embedded in hardware.

Moreover, in one aspect of the disclosure, the processor 1402 illustrated in FIG. 14 may be a specialized processor (e.g., ASIC) that is specifically designed to perform the algorithms, methods, and/or steps described in FIGS. 6, 7, 8, 9, 10, 11, 12, 13, 15, 16, and 17. The memory 1404 may also store processor 1402 readable instructions that when executed by the specialized processor causes the processor to perform the algorithms, methods, and/or steps described in FIGS. 6, 7, 8, 9, 10, 11, 12, 13, 15, 16, and 17.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method of wireless communication, comprising:
   aligning a searcher task that utilizes a receiver circuitry within a user equipment (UE), wherein at least a portion of the searcher task is aligned to be performed during a time that the receiver circuitry is enabled in the UE to monitor downlink transmissions, wherein the time comprises a discontinuous reception (DRX) time interval; and
   executing the searcher task during the time that the receiver circuitry is enabled in the UE,
   wherein the aligning of the searcher task comprises retaining a searcher task frequency as utilized in a non-DRX mode.

2. The method of claim 1, wherein the time that the receiver circuitry is enabled in the UE comprises a time interval when a fractional downlink physical channel (F-DPCH) is monitored.

3. The method of claim 2, wherein monitoring of the F-DPCH is associated with discontinuous transmission (DTX) of uplink dedicated physical control channel (DPCCH) bursts.

4. The method of claim 1, wherein the time that the receiver circuitry is enabled in the UE further comprises a period of time that is prior to the DRX time interval.

5. The method of claim 1, wherein the DRX time interval comprises at least one subframe, and occurs with a periodicity corresponding to a modulus of one of 4, 5, 8, 10, 16, or 20 subframes.

6. The method of claim 1, wherein the DRX time interval comprises at least one frame, and occurs with a periodicity corresponding to a modulus of one of 4, 8, 16, or 32 frames.

7. The method of claim 1, wherein the DRX time interval comprises a schedule for monitoring of downlink transmissions on at least a high speed shared control channel (HS-SCCH).

8. The method of claim 7, wherein the searcher task is aligned to execute at substantially the same time as the HS-SCCH monitoring begins.

9. The method of claim 7, wherein the searcher task is aligned to execute some time before the HS-SCCH monitoring begins, and the receiver circuitry is enabled during this time in anticipation of the HS-SCCH monitoring.

10. The method of claim 1, wherein the DRX time interval comprises a schedule for monitoring of downlink transmissions on at least an enhanced absolute grant channel (E-AGCH).

11. The method of claim 1, wherein the searcher task is completed prior to an end of the DRX time interval.

12. The method of claim 1, wherein the searcher task lasts longer than the DRX time interval, and the receiver circuitry remains enabled at least until an end of the searcher task.

13. The method of claim 1, wherein a plurality of searcher tasks are executed in a single DRX time interval.

14. The method of claim 1, further comprising:
   initializing a timer during the DRX time interval when information relevant to the user equipment is received on a downlink channel;
   extending the time that the receiver circuitry is enabled until an expiry of the timer; and
   aligning execution of the searcher task during a running of the timer.

15. An apparatus for wireless communication, comprising:
   a communications interface configured to communicate with a network; and
   a processor communicatively coupled to the communications interface, the processor configured to:
      align a searcher task that utilizes a receiver circuitry within a user equipment (UE), wherein at least a portion of the searcher task is aligned to be performed during a time that the receiver circuitry is enabled in the UE to monitor downlink transmissions, wherein the time comprises a discontinuous reception (DRX) time interval; and
      execute the searcher task during the time that the receiver circuitry is enabled in the UE,
   wherein the aligning of the searcher task comprises retaining a searcher task frequency as utilized in a non-DRX mode.

16. The apparatus of claim 15, wherein the time that the receiver circuitry is enabled in the UE comprises a time interval when a fractional downlink physical channel (F-DPCH) is monitored.

17. The apparatus of claim 16, wherein monitoring of the F-DPCH is associated with discontinuous transmission (DTX) of uplink dedicated physical control channel (DPCCH) bursts.

18. The apparatus of claim 15, wherein the time that the receiver circuitry is enabled in the UE further comprises a period of time that is prior to the DRX time interval.

19. The apparatus of claim 15, wherein the DRX time interval comprises at least one subframe, and occurs with a periodicity corresponding to a modulus of one of 4, 5, 8, 10, 16, or 20 subframes.

20. The apparatus of claim 15, wherein the DRX time interval comprises at least one frame, and occurs with a periodicity corresponding to a modulus of one of 4, 8, 16, or 32 frames.

21. The apparatus of claim 15, wherein the DRX time interval comprises a schedule for monitoring of downlink transmissions on at least a high speed shared control channel (HS-SCCH).

22. The apparatus of claim 21, wherein the searcher task is aligned to execute at substantially the same time as the HS-SCCH monitoring begins.

23. The apparatus of claim 21, wherein the searcher task is aligned to execute some time before the HS-SCCH monitoring begins, and the receiver circuitry is enabled during this time in anticipation of the HS-SCCH monitoring.

24. The apparatus of claim 15, wherein the DRX time interval comprises a schedule for monitoring of downlink transmissions on at least an enhanced absolute grant channel (E-AGCH).

25. The apparatus of claim 15, wherein the searcher task is completed prior to an end of the DRX time interval.

26. The apparatus of claim 15, wherein the searcher task lasts longer than the DRX time interval, and the receiver circuitry remains enabled at least until an end of the searcher task.

27. The apparatus of claim 15, wherein a plurality of searcher tasks are executed in a single DRX time interval.

28. The apparatus of claim 15, wherein the processor is further configured to:
   initialize a timer during the DRX time interval when information relevant to the user equipment is received on a downlink channel;
   extend the time that the receiver circuitry is enabled until an expiry of the timer; and
   align execution of the searcher task during a running of the timer.

29. An apparatus for wireless communication, comprising:
   means for aligning a searcher task that utilizes a receiver circuitry within a user equipment (UE), wherein at least a portion of the searcher task is aligned to be performed during a time that the receiver circuitry is enabled in the UE to monitor downlink transmissions, wherein the time comprises a discontinuous reception (DRX) time interval; and
   means for executing the searcher task during the time that the receiver circuitry is enabled in the UE,
   wherein the aligning of the searcher task comprises retaining a searcher task frequency as utilized in a non-DRX mode.

30. A non-transitory computer-readable medium having instructions, which when executed by at least one processor causes the processor to:
   align a searcher task that utilizes a receiver circuitry within a user equipment (UE), wherein at least a portion of the searcher task is aligned to be performed during a time that the receiver circuitry is enabled in the UE to monitor downlink transmissions, wherein the time comprises a discontinuous reception (DRX) time interval; and
   execute the searcher task during the time that the receiver circuitry is enabled in the UE,
   wherein the aligning of the searcher task comprises retaining a searcher task frequency as utilized in a non-DRX mode.

* * * * *